Figure 1:
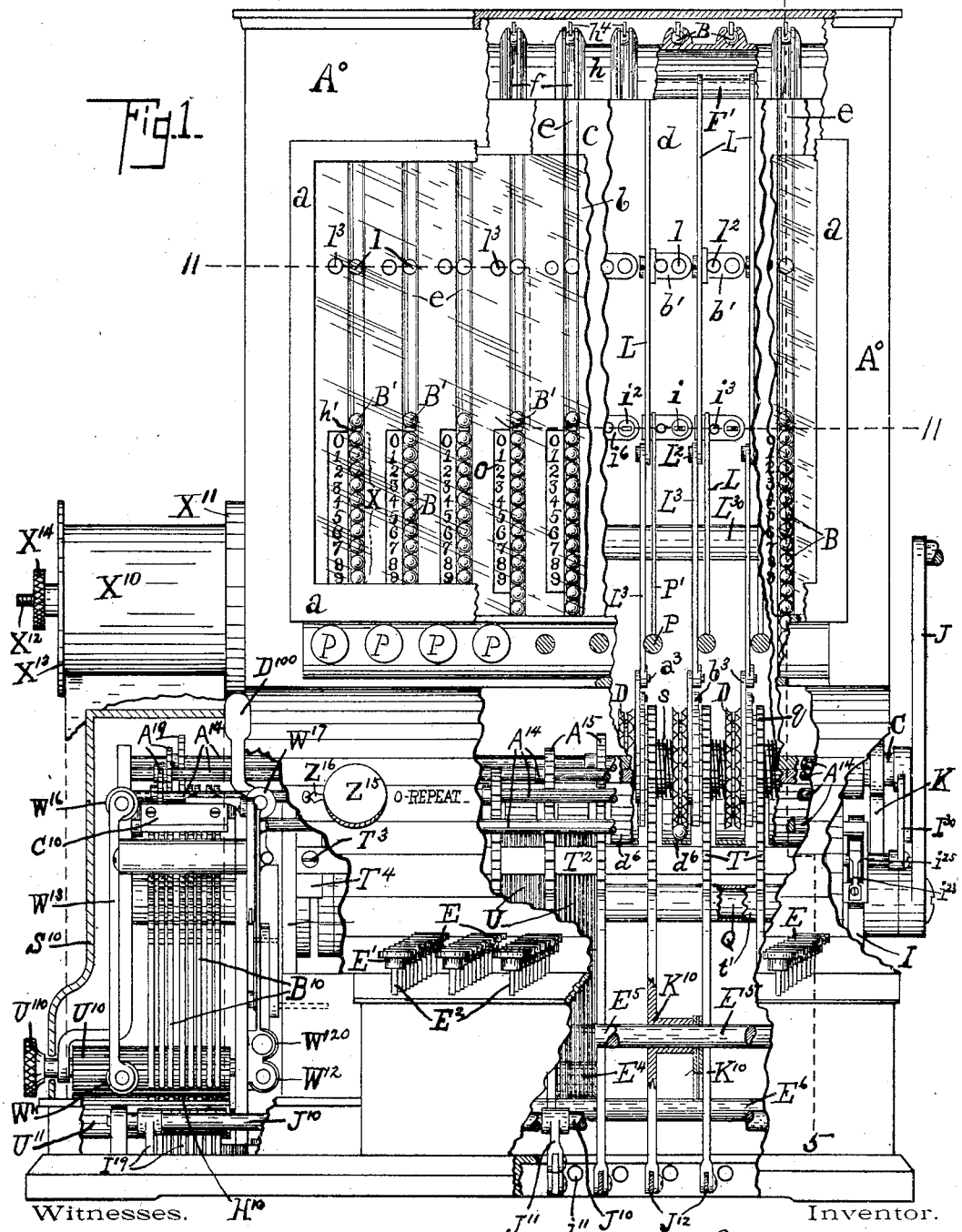

No. 789,143. PATENTED MAY 9, 1905.
W. H. CLARK.
CALCULATING MACHINE.
APPLICATION FILED NOV. 9, 1897.

15 SHEETS—SHEET 1.

Witnesses. Inventor.
William H. Clark
by Osgood & Davis
his Attorneys.

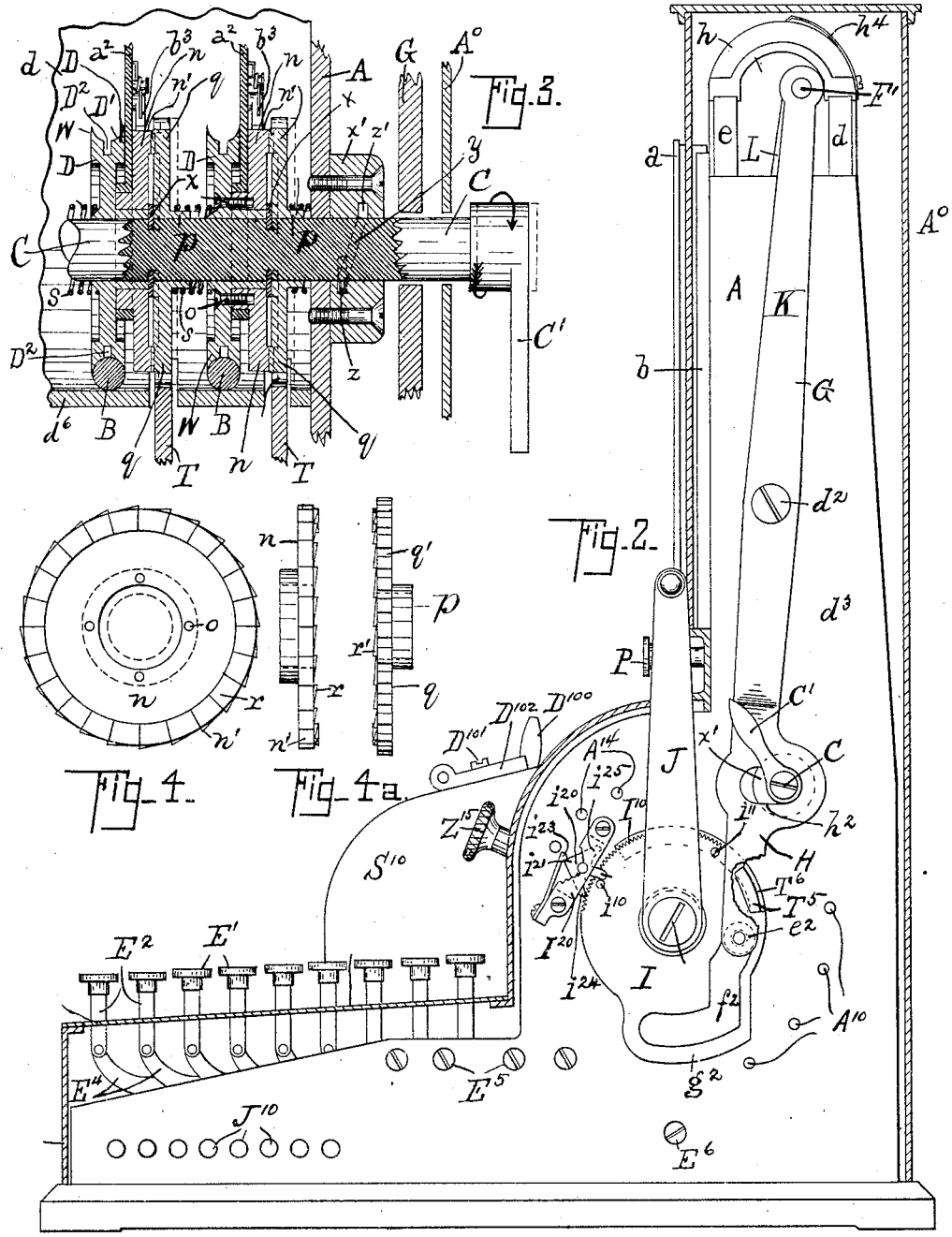

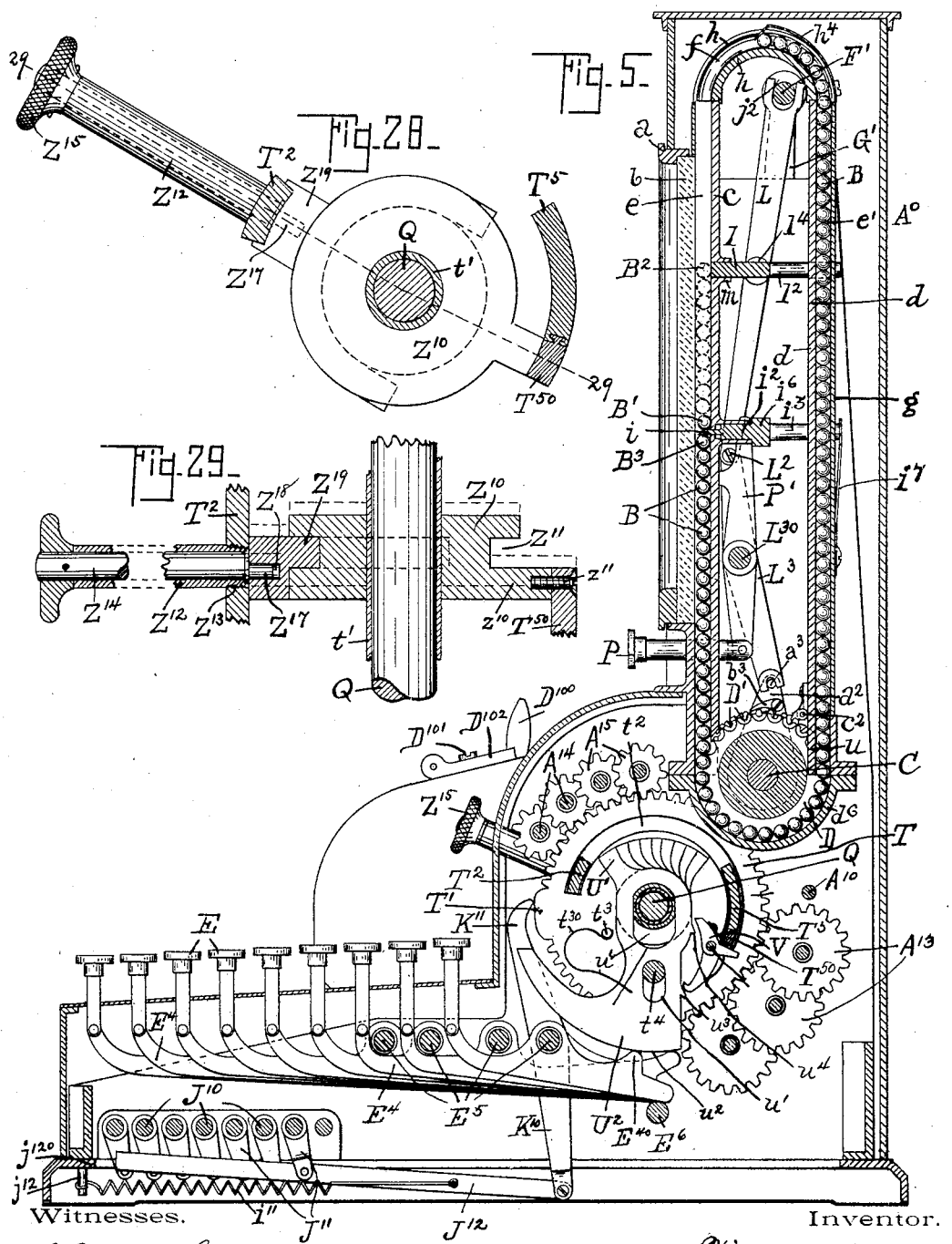

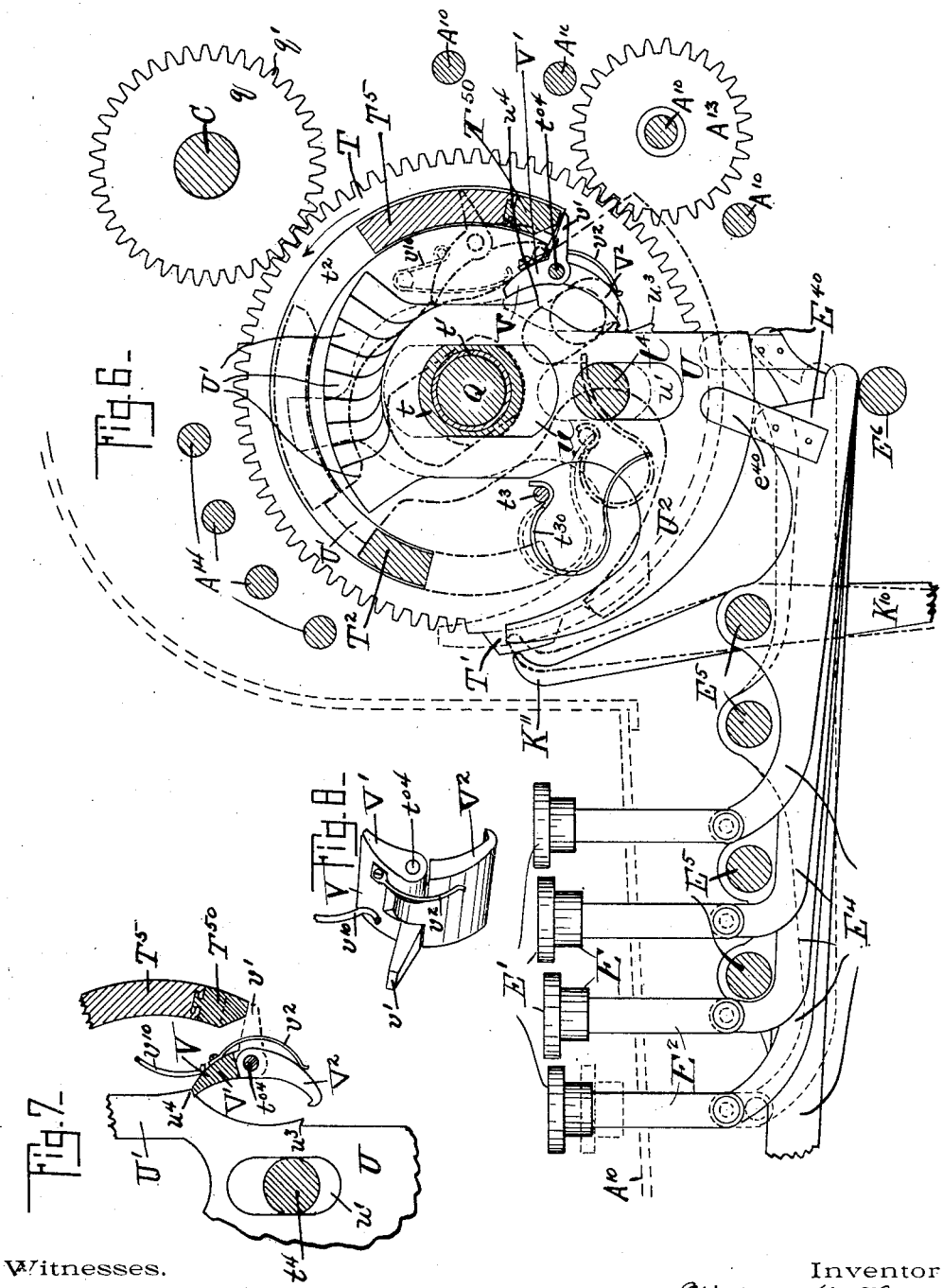

No. 789,143. PATENTED MAY 9, 1905.
W. H. CLARK.
CALCULATING MACHINE.
APPLICATION FILED NOV. 9, 1897.

15 SHEETS—SHEET 5.

Witnesses. Inventor.
C. R. Osgood William H. Clark
A. R. Selden. by Osgood & Davis
his Attorneys No. 789,143. PATENTED MAY 9, 1905.
W. H. CLARK.
CALCULATING MACHINE.
APPLICATION FILED NOV. 9, 1897.
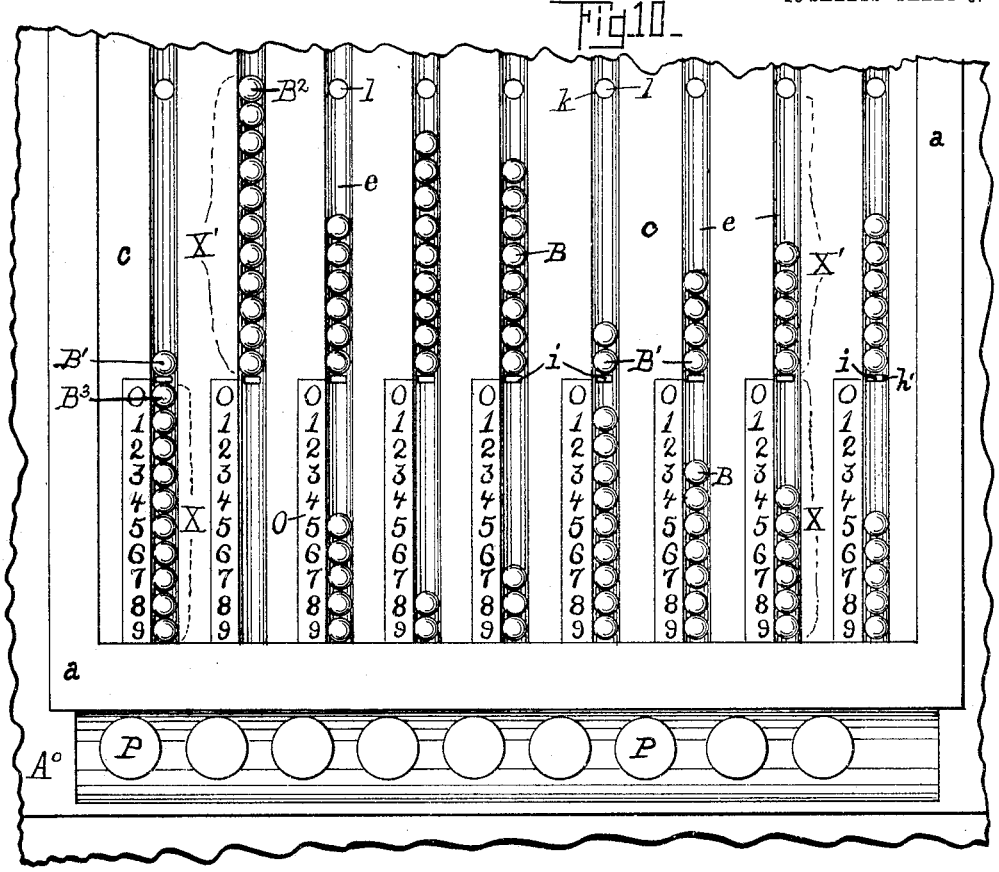
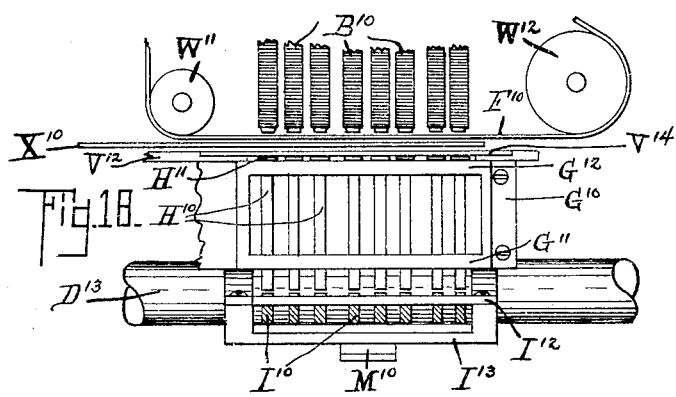
Witnesses.
Inventor.

No. 789,143. PATENTED MAY 9, 1905.
W. H. CLARK.
CALCULATING MACHINE.
APPLICATION FILED NOV. 9, 1897.
15 SHEETS—SHEET 7.
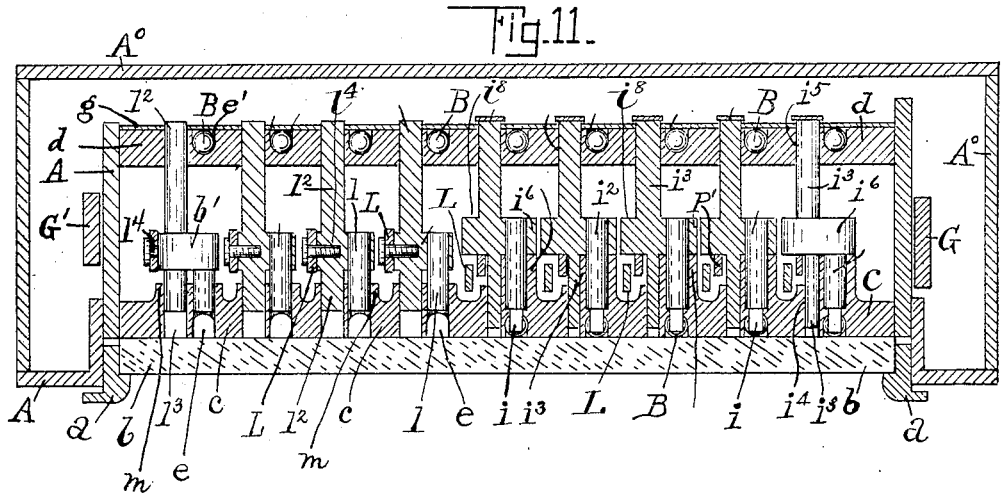
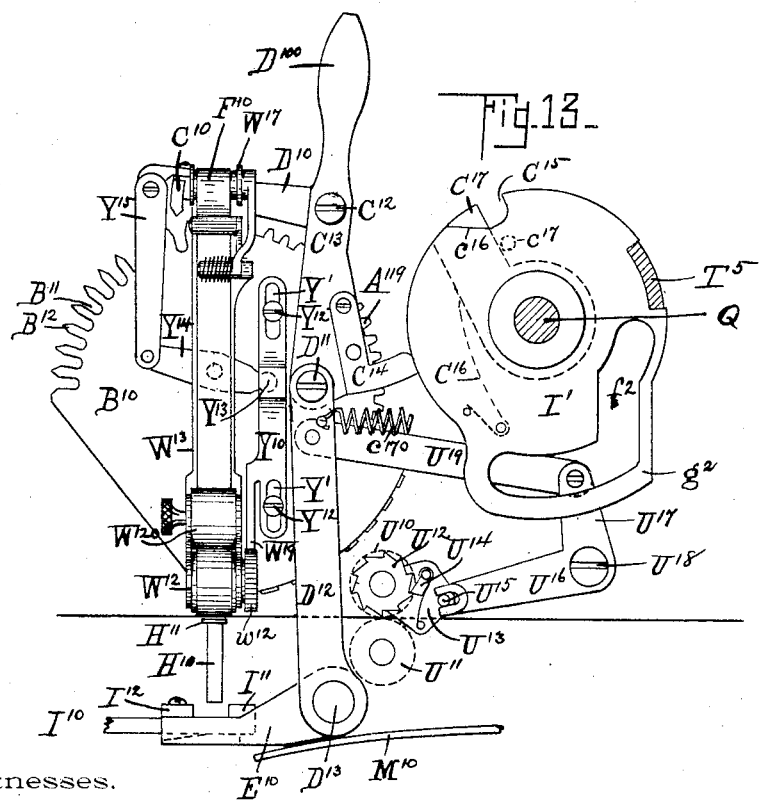
Witnesses. Inventor.

No. 789,143. PATENTED MAY 9, 1905.
W. H. CLARK.
CALCULATING MACHINE.
APPLICATION FILED NOV. 9, 1897.
15 SHEETS—SHEET 8.
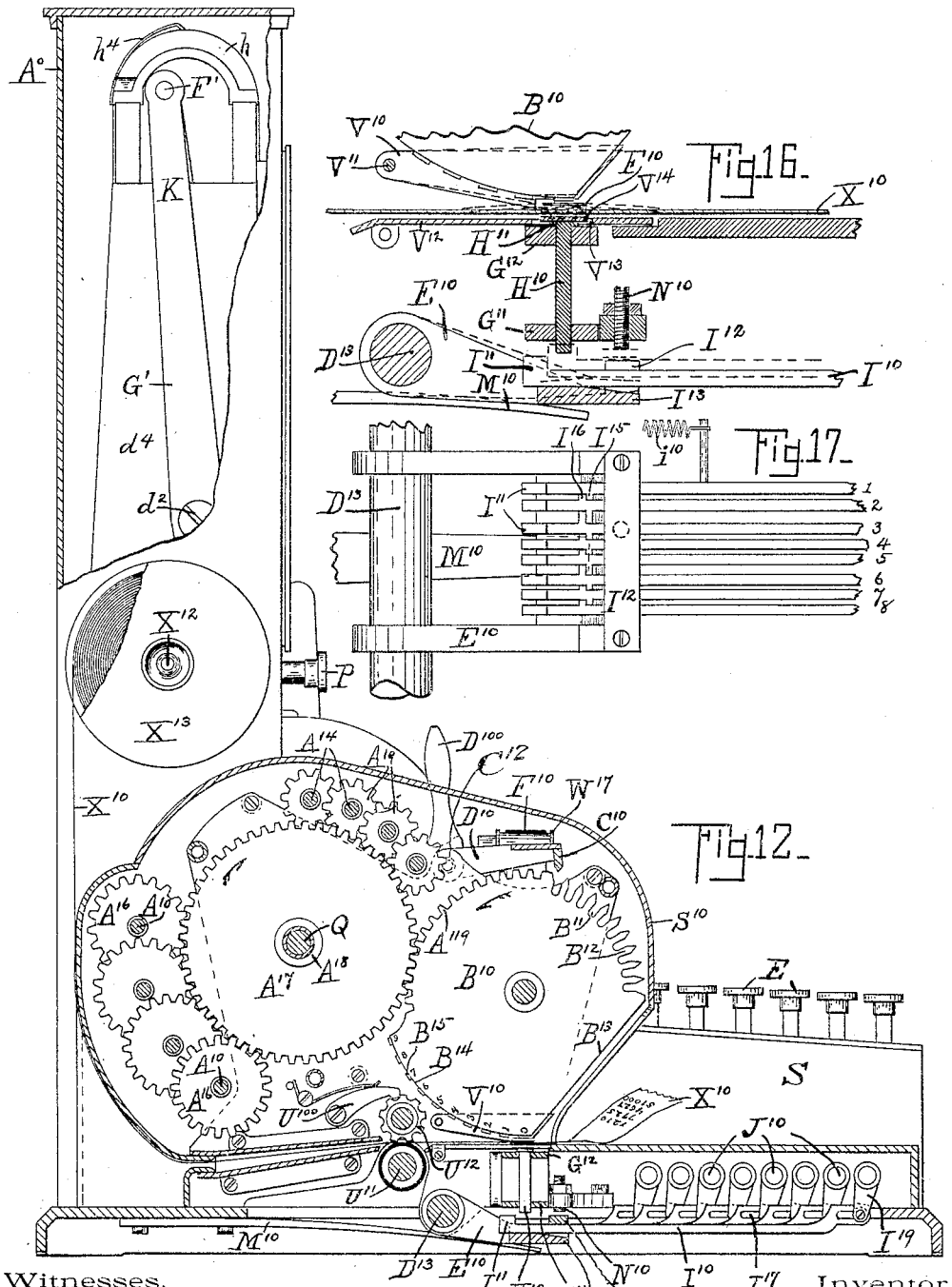

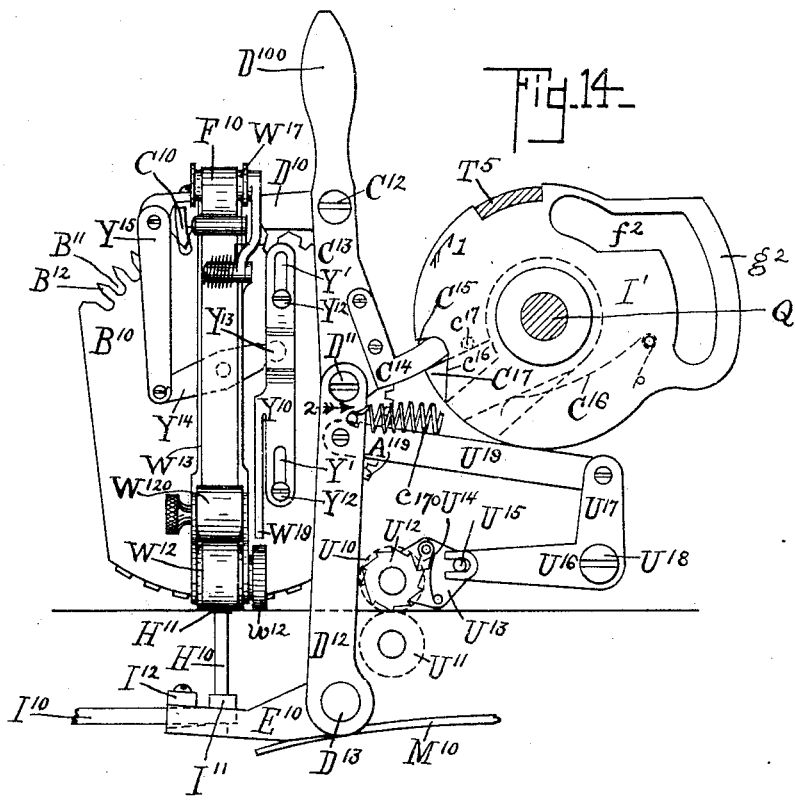

No. 789,143.  
PATENTED MAY 9, 1905.
W. H. CLARK.  
CALCULATING MACHINE.  
APPLICATION FILED NOV. 9, 1897.
15 SHEETS—SHEET 10.
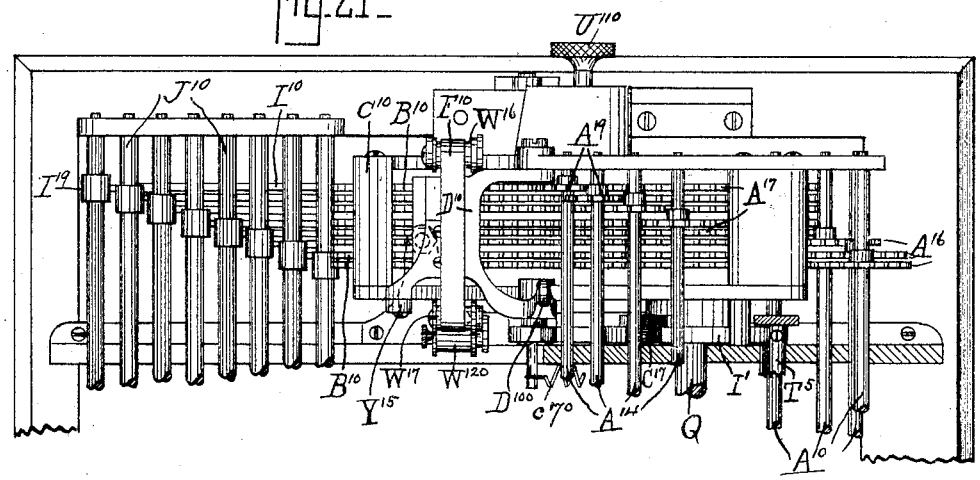
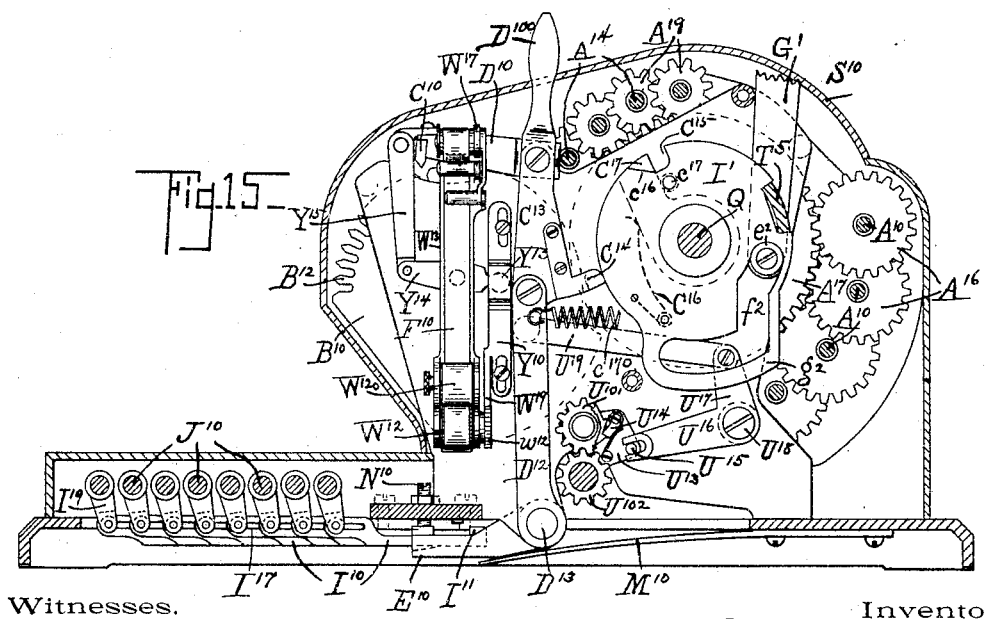

No. 789,143. PATENTED MAY 9, 1905.
W. H. CLARK.
CALCULATING MACHINE.
APPLICATION FILED NOV. 9, 1897.
15 SHEETS—SHEET 11.
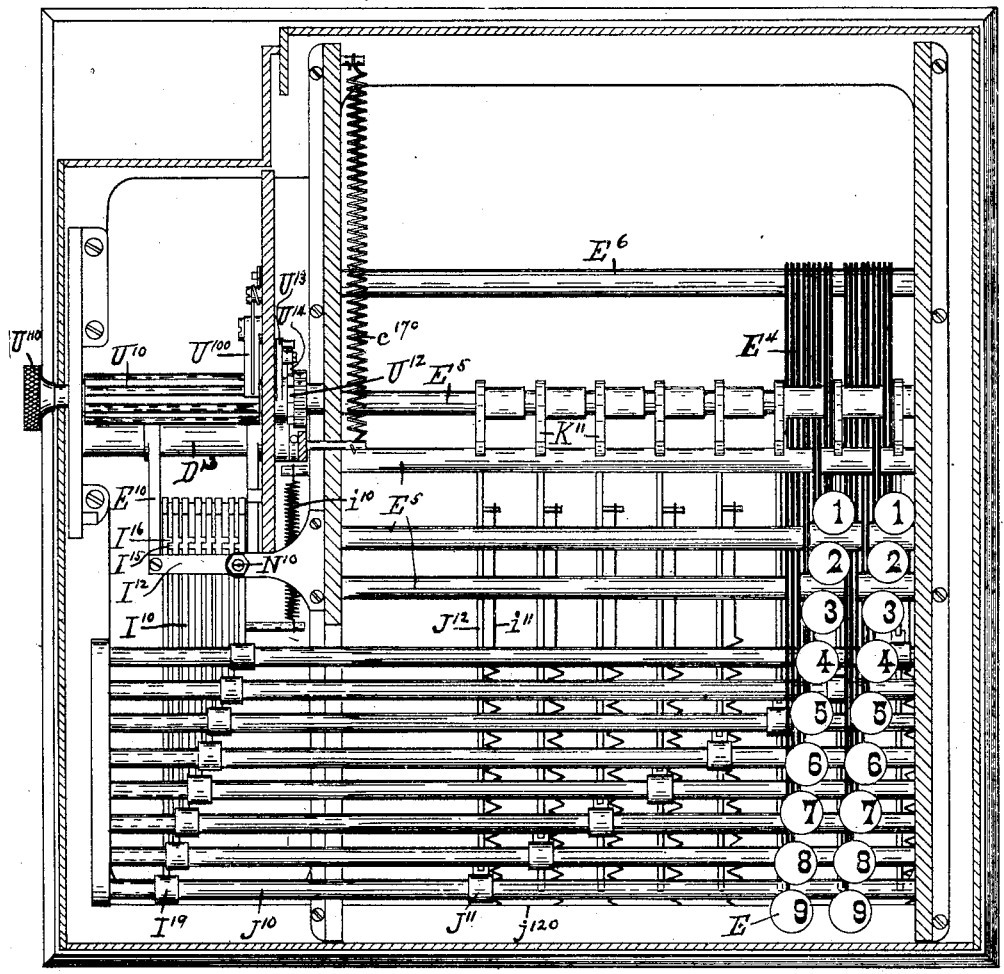
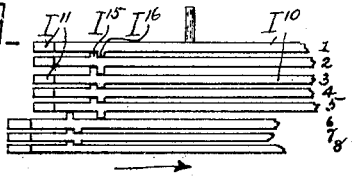
Witnesses.
Inventor.

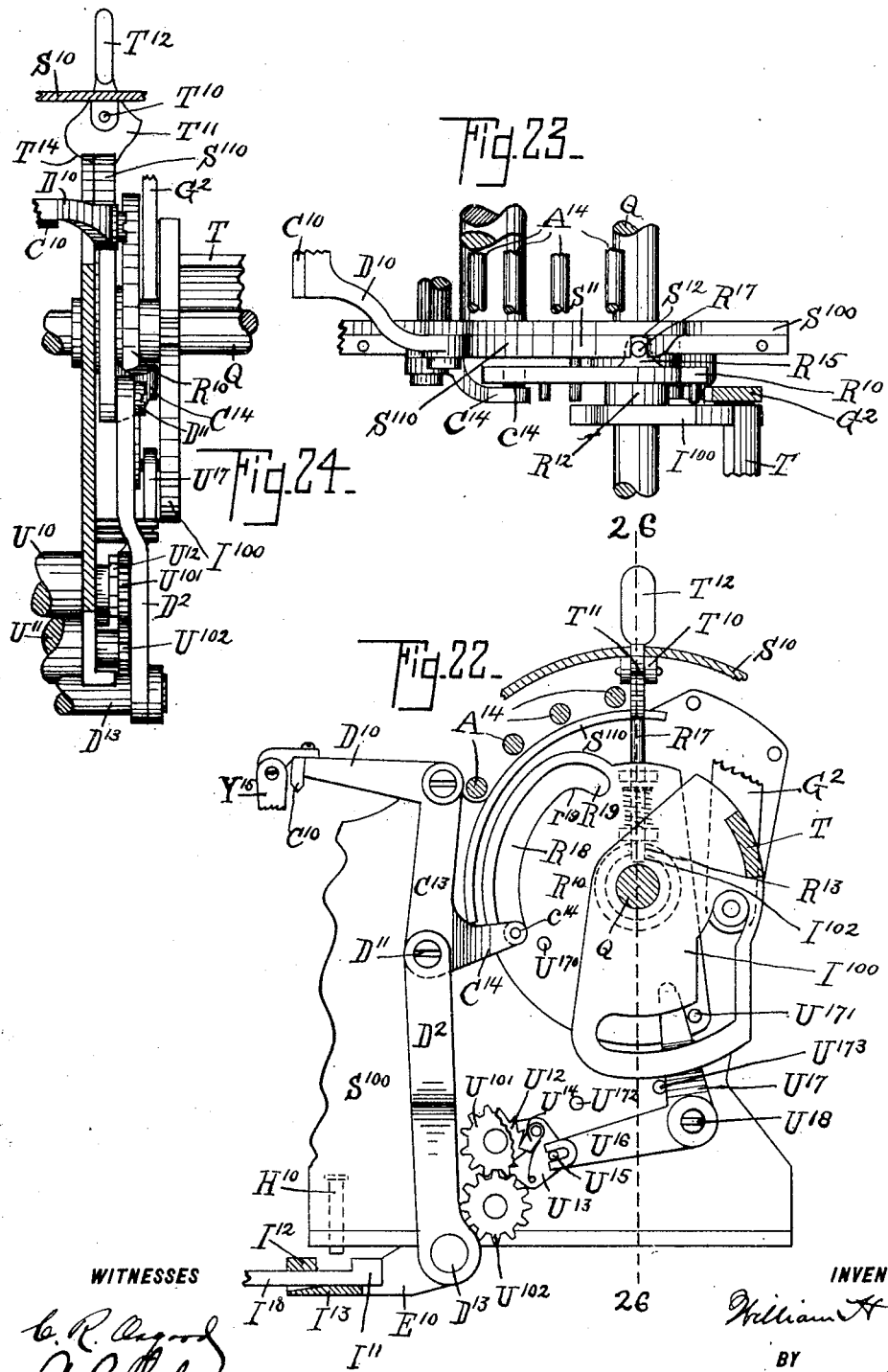

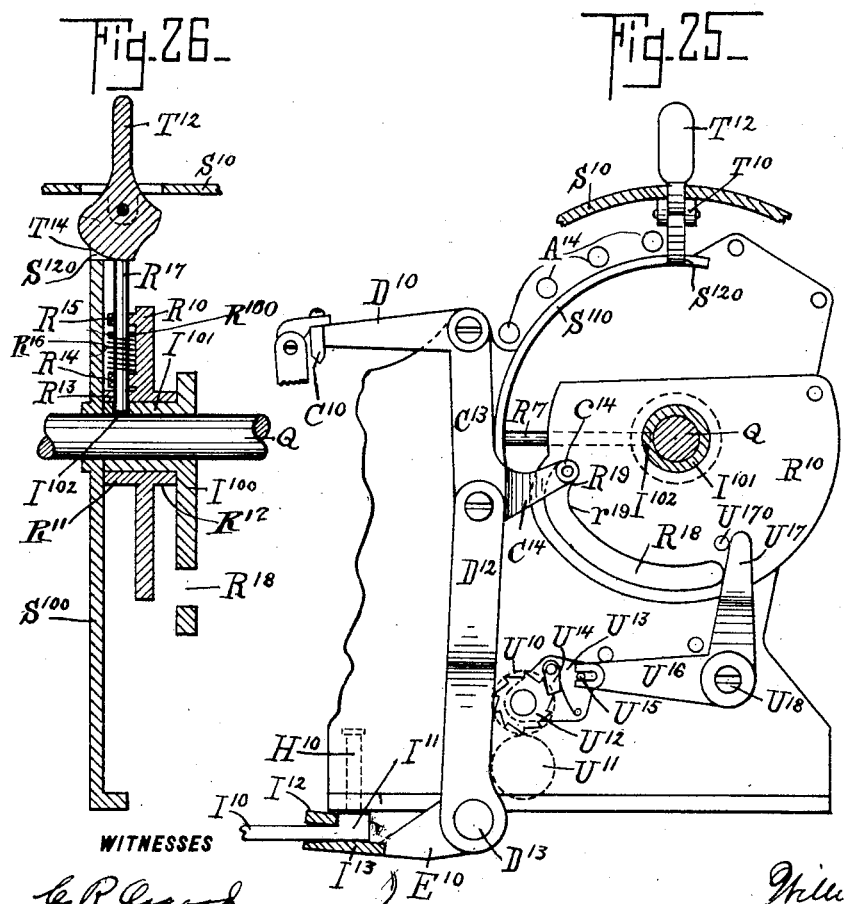

No. 789,143. PATENTED MAY 9, 1905.
W. H. CLARK.
CALCULATING MACHINE.
APPLICATION FILED NOV. 9, 1897.
15 SHEETS—SHEET 14.
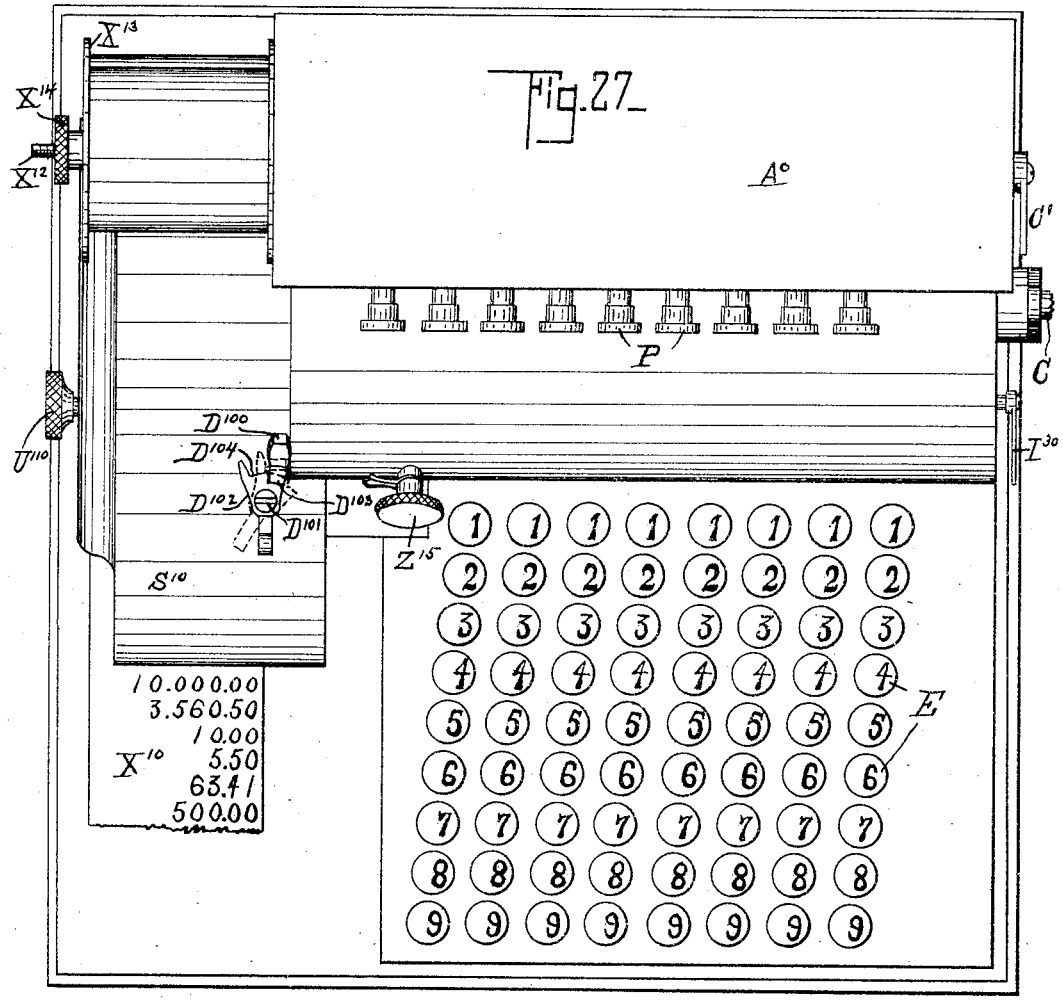
WITNESSES
C. R. Osgood
A. R. Selden
INVENTOR
William H. Clark
BY
Osgood + Davis
his ATTORNEYS.

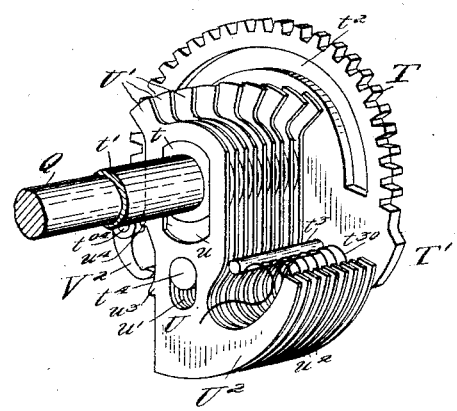

No. 789,143.

Patented May 9, 1905.

UNITED STATES PATENT OFFICE.

WILLIAM H. CLARK, OF ROCHESTER, NEW YORK, ASSIGNOR, BY MESNE ASSIGNMENTS, TO NATIONAL CASH REGISTER COMPANY, OF JERSEY CITY, NEW JERSEY, A CORPORATION OF NEW JERSEY.

CALCULATING-MACHINE.

SPECIFICATION forming part of Letters Patent No. 789,143, dated May 9, 1905.

Application filed November 9, 1897. Serial No. 657,968.

*To all whom it may concern:*

Be it known that I, WILLIAM H. CLARK, a citizen of the United States, and a resident of Rochester, in the county of Monroe and State of New York, have invented certain new and useful Improvements in Calculating-Machines, of which the following is a specification.

This invention relates to calculating-machines; and it consists, substantially, in such improvements as will hereinafter be more particularly described.

The first part of my invention comprises a register or mechanism for indicating visually a numeric quantity contained in a column of figures to be added and also for indicating successive sums-total made up by the addition of two or more quantities. The said register or indicating mechanism includes a series of movable tally-pieces, (each representing a unit of value,) which series comprises an indicating-column of said tally-pieces and is operated to indicate by diminutions or lowerings of the column to an amount or value corresponding to the respective key values. The same series also includes devices for forming a column of movable tally-pieces operating by accumulation for resetting the first or registering column to zero by adding thereto enough tally-pieces to restore its initial or maximum height and also comprises different series of movable tally-pieces, each series representing a different denomination operated by movement, diminution, or lowering of the indicating-column in each series to indicate numeric values of different denominations. Still further, the said registering or indicating mechanism comprises a series of indicating-columns of movable tally-pieces operating by movement, diminution, or lowering of the columns to indicate numeric values of different denominations, with carrying mechanism between the columns. The mechanism comprises still other features hereinafter described.

Each indicating-column of movable tally-pieces is normally maintained at a height to indicate values which range from "0" to the number "9," inclusive, and in order to effect the indication of values equal to and exceeding ten carrying devices employed are actuated from the series of a lower denomination to move, diminish, or lower the indicating-column of the next higher denomination to the extent of one tally-piece. As the movable tally-pieces are moved, diminished, or lowered in one indicating or registering column of a series they are accumulated to the same degree in another column by tally-pieces complementary in number to the number of tally-pieces which indicate the amount in the indicating-column and are there held in the accumulating column until the number of pieces equals or exceeds the indicated denominational maximum, which of course is ten in a decimal system, whereupon by the operation of suitable devices ten tally-pieces, if the system is decimal, are delivered from the accumulating column to the indicating-column, restoring the indicating-column to zero, ready to be operated as before.

In this specification I set forth one way of operating the indicating-column by moving it bodily, and thus diminishing or lowering it. I can support these indicating and accumulating columns in different ways; but preferably I support them one above the other in an endless guideway, as hereinafter more particularly described, and in connection therewith I employ a suitable reservoir for containing the storage-supply of tally-pieces, which reservoir is common to both the said indicating and accumulating columns, all of which will more fully hereinafter appear when taken in connection with the accompanying drawings, wherein—

Figure 9:
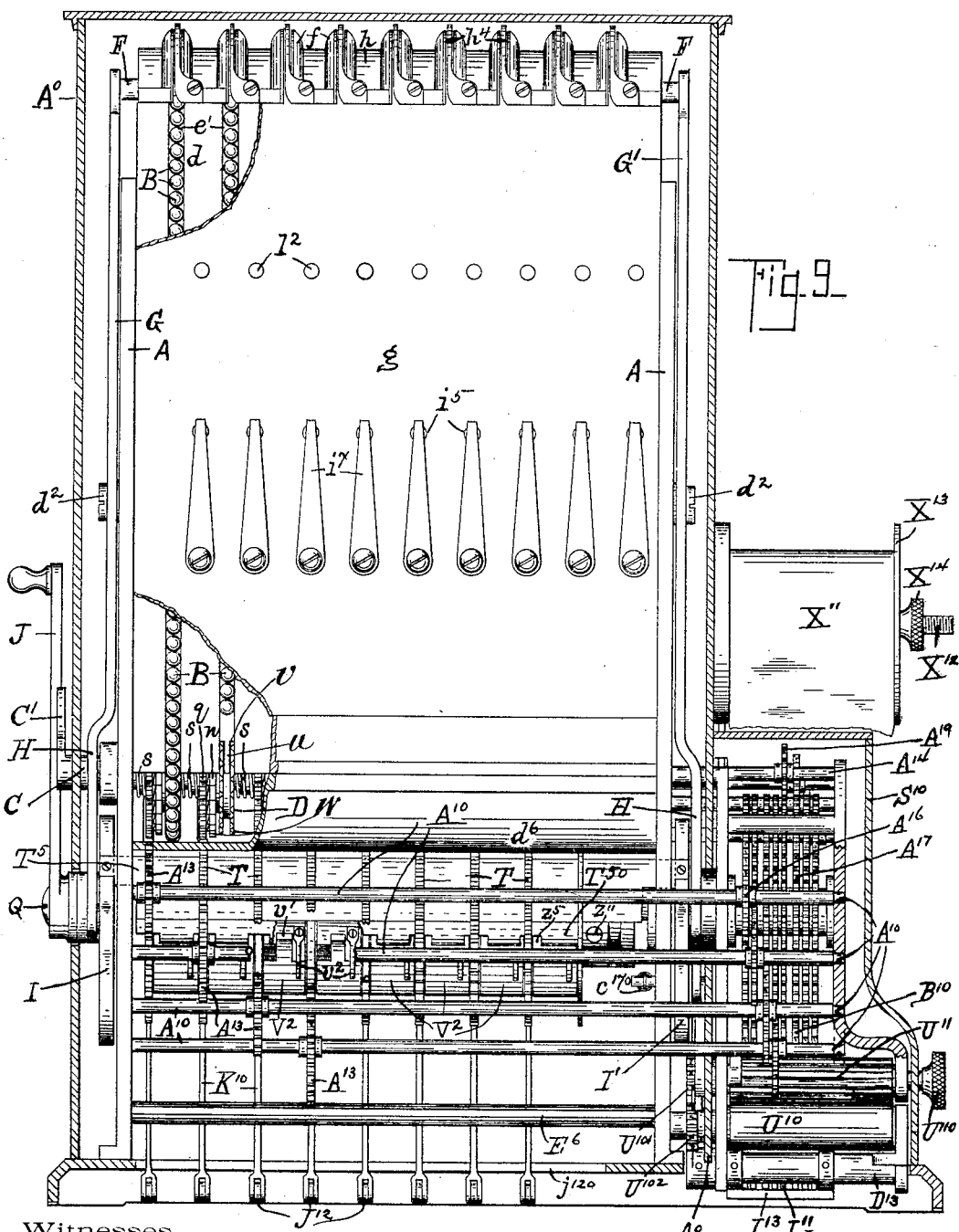

Figure 1 represents a front elevation of a calculating-machine embodying my improvements the same being partly broken away and partly in section to more clearly indicate the construction and arrangement of the several parts. Fig. 2 is an end elevation taken from the right side of the machine. Fig. 3 is an enlarged sectional view in detail to more clearly indicate the construction and operation of the pocket-wheels for the movable tally-pieces and the clutch mechanism which operates said wheels. Fig. 4 is a face view of one of the members of the clutch mechanism for the pocket-wheel, and Fig. 4$^a$ is an edge view of the two members or parts of the clutch mechanism. Fig. 5 is a vertical sectional elevation taken on the line 5 5 of Fig. 1. Fig. 6 is an enlarged view, partly in elevation and partly in section, of the movable keys or actuating devices, the setting mechanism, and the means which operate the actuating devices for the pocket-wheel. Fig. 7 is an enlarged sectional view showing the construction and relation between certain parts constituting the setting mechanism. Fig. 8 is an enlarged view in perspective of the double-acting locking-dog for engaging the plates of the setting mechanism whenever they are moved upward by the actuating-keys. Fig. 9 is a rear elevation of the entire machine, partly in section. Fig. 10 is an enlarged front view of the glass face-plate to indicate the manner in which some of the calculations are carried out. Fig. 11 is an enlarged sectional plan view taken on the line 11 11 of Fig. 1. Fig. 12 is an end elevation partly in section and showing more clearly the arrangement of the printing-plates and the mechanism for operating the same. Fig. 13 is an enlarged side elevation in detail of one embodiment of my invention for operating certain portions of the printing mechanism. Fig. 14 is a similar view representing the same parts in a different position. Fig. 15 is a similar view to Fig. 12 looking from the opposite direction and showing the operating-cam and the printing-ribbon and feed for the latter. Figs. 16 and 17 are respectively a detailed side view of the platen-operating bars and striker and a top plan view thereof. Fig. 18 is a front detail view of the movable platens and their supporting-frame, together with a portion of the type-plates, and the platen-operating bars in section. Fig. 19 is a plan view in detail to show the construction of the bars for lifting the movable platens. Fig. 20 is a sectional plan view of the machine to show the means for operating the platen-operating bars. Fig. 21 is a top plan view of the printing mechanism broken off from the rest of the machine. Figs. 22 to 26, inclusive, are enlarged detail views of a modification of the mechanism for operating the swinging frame and the striker-frame for the platen-bars. Fig. 27 is a top plan view of the whole machine. Figs. 28 and 29 are detail views, enlarged, of the devices embodying the repeating mechanism of the indicating and printing mechanisms. Fig. 30 represents a detail perspective view of one of the main operating-gears, its series of plates, lateral pin, and springs. Fig. 31 represents a detail perspective view of the transfer-levers, sliding plugs, and coöperating parts; and Fig. 32 represents a detail perspective view of two of the operating-plates and their interposed washer.

In the accompanying drawings I have shown a preferred embodiment for carrying out the said first part of my invention and wherein A$^0$ represents a casing inclosing the operating mechanism and A represents a suitable main frame by which the several operative devices of the machine are supported and which is provided with a frame $a$, which holds or supports a face-plate $b$, preferably of glass, against the main frame A. Upon said main frame is a front plate $c$ and a rear plate $d$, each of which is formed with a series of vertical channels, guides, or ways, (indicated at $e$ and $e'$, respectively,) and connecting the corresponding ways of each plate at the top is a curved or arched channel or way $f$, establishing communication between the said guideways $e$ and $e'$ in an obvious manner. At the lower end the plates $c$ and $d$ are connected by a curved or concave plate $d^6$, (see Fig. 5,) which serves to retain tally-pieces in the edge of the pocket-wheel hereinafter described, the said plate $d^6$ constituting a track or way for the travel of the tally-pieces as they pass from the decumulating column. There are as many of these ways $e\ e'$ formed in the said plates $c$ and $d$ as there are denominations of movable tally-pieces B and operating key-banks therefor, and the ways $e'$ in the rear plate are what I term the "storage" or "reservoir" ways containing a proper supply of said movable tally-pieces. The guides or ways support the indicating and accumulating columns of movable tally-pieces, as will hereinafter appear, and when operating in the said ways the said movable tally-pieces move within and along the continuous and endless guideways and the inner surface of the glass front plate $b$. When running in the ways or guides $e'$ of the rear plate $d$, the movable tally-pieces are retained in said ways by a cover or plate $g$, which is secured to the rear plate $d$ in any suitable manner. Both the front and rear plates $c$ and $d$ and the curved plate $h$, (having in it the ways $f$,) connecting the two at the top, may be single plates having the guides or ways $e, e'$, and $f$ cast in them, or they may each be made up of multiple sections joined together, as desired. The channels or ways just described constitute in each series an endless guideway for a denominational series of tally-pieces. Formed in the front plate $c$ at the back of each guide or way $e$ and at a point directly above the top of the tenth movable tally-piece B of an indicating-column X in each of said guides $e$ is a transverse slot $h'$, (see Figs. 1 and 10,) through which normally projects a movable stop or shelf $i$, upon which an eleventh tally-piece is normally detained or supported, as indicated at B', and while this particular tally-piece B' is moved from this position and is replaced by others from time to time either the said piece or its substitute constitutes a working tally-piece, through the medium of which certain operations are accomplished. Also formed in the front plate c at the back of each of the guides or ways e therein and corresponding to the height of the eleventh tally-piece in a column X' thereof, supported on said movable shelf i, is an opening k, (see Figs. 1 and 10,) in which works a sliding or reciprocating plug l, which is normally in a retracted position within a guide m (see Fig. 5) therefor, but which on each operation of the mechanism is first carried into the guide or way e and then out again. Said reciprocating plugs l are carried by arms b' on main operating-plugs $l^2$, which latter reciprocate in sockets $l^3$, formed in the front plate c, and the rear ends of said main plugs are guided in a similar manner in the rear plate d. (See Fig. 11.) The movable shelf i, above described, also normally projects into the way e; but whenever in any denomination the indicated denominational maximum of ten has been reached or exceeded then the said movable shelf is withdrawn automatically and is again projected into the way. The purpose and operation of the said movable stop or shelf, together with the reciprocating plugs, will be described more fully hereinafter; but it may be stated here that each movable shelf i is set on the end of a short plug $i^2$, which in turn is carried by a lug $i^6$ of a main plug $i^3$, working in guides $i^4$ and $i^5$ in the front and rear plates c and d. After the shelves are withdrawn temporarily, as described hereinafter, they are again forced outward by means of spring-plates $i^7$, secured to the back plate g and always pressing the main plug $i^3$ forward.

Passing between the front and rear plates c and d at or near their lower edges is a shaft C, (see Figs. 3 and 5,) which is supported at each side of the main frame A in suitable bearings, and placed on said shaft in a position corresponding to or coinciding with the position of each of the said ways e and e' in the front and rear plates c d is a pocket-wheel D, having in or on its periphery a series of pockets D', each capable of engaging and holding one of said tally-pieces. The said wheel moves the tally-pieces, as hereinafter explained, but is adapted to operate only in one direction. As will be explained, the edge of the pocket-wheel extends into the endless guideway formed by the system of channels or ways and constitutes a rotary device engaging the tally-pieces in series. Secured to the hub of each of the said pocket-wheels D by screws o (see Fig. 3) is one clutch member or portion n, having ratchet-teeth n' in its periphery, and carried by a hub p, sliding longitudinally on the said pocket-wheel shaft C, is the other or driving member q of said clutch, provided with gear-teeth q' in its periphery, the two members having on their adjacent side faces a series of oppositely inclined or beveled teeth r and r'. These beveled or inclined teeth of the two parts of the clutch are normally interlocked or engaged, and they are held in engagement with a yielding action by means of a coiled spring s, surrounding the shaft C and exerting its pressure between the movable member q of the clutch and the next adjacent pocket-wheel, or, as shown in Fig. 3, the first clutch member q is held by the spring s against its corresponding clutch member by pressure of the spring against the frame A. Neither the pocket-wheels nor the clutch members n have any longitudinal movement on the shaft C, but turn freely thereon whenever the clutch members are disengaged. In order to maintain the said pocket-wheels in proper relative positions on the shaft C, as well as to prevent longitudinal movement of these wheels on the shaft, I provide in each of the said pocket-wheels a circumferential groove or channel $D^2$, (see Fig. 3,) which leads inward from and is common to all the pockets D' in the wheel, and into each of these grooves there extends a tongue u, projecting from the rear way-plate d, (see Figs. 5 and 9,) which both prevents longitudinal movement of its pocket-wheel on the shaft C and also prevents its wheel from carrying tally-pieces all the way around the wheel, but forces them to be carried up into the guides or ways e', formed in the said rear plate d. The lower edge of the rear way-plate is cut out at v (see Fig. 9) on each side of each tongue u sufficient to permit the movement of the flanges w (see Figs. 3 and 9) of the wheel constituting the sides of the pockets in said wheel, and in this way the tally-pieces as they are moved in the lower or indicating columns are compelled to pass up into the ways e' in the said rear plate d, which ways e' I denominate "storage" or "reservoir" ways because they contain the main body of a series of tally-pieces B, which always fill said storage-ways, as shown in Fig. 5. As a number of tally-pieces are thus forced up into the storage or reservoir ways from beneath a corresponding number of tally-pieces are forced through the connecting-ways f over and into the upper ends of the ways e of the front plate c, and the tally-pieces B thus forced over drop down upon the tally-pieces B' on the movable stops or shelves i, and thus form the accumulating column, from which tally-pieces are delivered from time to time to reset the indicating-column to zero by restoring the maximum height of the indicating-column. The tally-pieces in the accumulating column are always complementary in number to the number of tally-pieces which indicate the amount in the indicating-column, or if the top of the indicating-column is below the reading-line, and thus the reading maximum of the column has been exceeded, the tally-pieces in the accumulating column are complementary in number to the tally-pieces by which the indicating-column has been reduced. These operations are carried out as hereinafter more particularly described.

In order to disconnect or throw out of operation the clutch devices which operate the pocket-wheels D, I provide the shaft C at points between the adjacent ends of the hubs of the clutch members $n$ and $q$ with split collars $x$, which are set into the shaft, as shown in Fig. 3, and I form in an extended bearing $x'$ for one end of the shaft a spiral groove $y$, in which enters a pin or lug $z$ on the shaft C. The ends of said groove or way terminate in sockets $z'$, which are in planes at right angles to the axis of the shaft and receive the lug or pin $z$ at either end of the groove $y$, and this limits the movement of the shaft C in either direction, as well as locks the shaft in either position to which it is turned. The end of the said shaft is provided with an operating-handle C', and by turning the shaft in the direction indicated by the arrow in Fig. 3 the shaft is moved outward to the extent permitted by the way or groove $y$ and pin $z$, whereby the collars $x$ on the shaft C force the movable driving members $q$ of the clutches out of engagement with the driven member $n$ and also move the shaft for a short distance until the shaft is locked, as above described, and thus the said driving members $q$ are free to rotate without moving the driven members $n$ of the clutches or the pocket-wheels D, which are fixed to said driven members or are integral therewith.

Whenever the key mechanism of any denomination has been operated, as hereinafter described, the pocket-wheel D corresponding thereto may be moved to operate the indicating or registering column X (see Fig. 10) to the extent of a number of tally-pieces corresponding to the value expressed by said key. This of course is accomplished by reason of the driving member $q$ of the clutch device being carried around freely in one direction a number of teeth corresponding to the value of the operated key mechanism and then on the return movement engaging the clutch member $n$, carried by the pocket-wheel, and thereby moving the said wheel, with the clutch device, as the latter is turned or carried back. It is understood that the distance between the lowest and highest part of the inclined teeth $r$ and $r'$ on the clutch members corresponds exactly to the diameter both of the tally-pieces B and of the pockets D' in the pocket-wheel.

In order to produce the proper movement of any indicating-column to the extent of one tally-piece, whenever the indicating-column of the next lower denomination has reached or exceeded the indication of its denominational maximum of ten I employ suitable carrying mechanism for operating the higher column, which I will now describe. On the hub of the driven member $n$ of each clutch device I provide a movable or rocking arm $a^2$, (see Figs. 2 and 3,) which is provided on its side with a pivoted pawl $b^3$, which normally runs over the ratchet-teeth $n'$ on the periphery of said clutch member $n$ when the pocket-wheel D is carried around forwardly in its movement. Also engaging the ratchet-teeth $n'$ is a pawl $c^2$, which prevents back movement of the clutch member $n$, and consequently of the pocket-wheel also. Thus it is seen that the driven clutch member is revoluble in one direction only, while the driving member is revoluble in both directions.

Extending across the machine at the top and arranged between the front and rear plates $e$ and $d$ thereof is a rod F', (see Figs. 2 and 3,) that is supported at the ends in the upper ends of swinging levers G G', which are pivoted at $d^2$ to the side plates $d^3$ and $d^4$ of the main frame A. The lower end of the lower arm H of each of the said swinging levers G and G' is provided on its inner side with a friction-roll $e^2$, which works in a cam-slot $f^2$, formed in an extension $g^2$ of the main operating cam-wheels I I'. The end of the shaft C, above referred to, corresponding to the side at which the handle J is arranged passes through a horizontal slot $h^2$, cut in the lower arm H of the lever G', and in this way the said lever is permitted to swing back and forth on its pivot $d^2$ without obstruction. The parts described are so arranged that when the main operating-handle J is carried forward the sides of the cam-slots $f^2$ bear against the friction-rollers $e^2$, and thus move the lower arms of both of the levers G G' in a backward direction. At the same time the upper arms K of the said levers are carried forward, and the rod or shaft F' is carried bodily therewith. On turning the operating-handle J backward the operation is reversed and these parts are restored to their normal positions.

Pivoted to each of the sliding or reciprocating plugs $l$ at $l'$ is a lever L, (see Figs. 5 and 31,) which at its upper end is forked at $j^2$ to embrace the rod or shaft F'. Each of these levers occupies a vertical position between two of the ways $e$. (See Figs. 1 and 11.) The levers L are normally in an inclined position between the front plate $c$ and rear plate $d$, with the upper ends thereof extending in the direction of the plate $d$ and the lower ends in the direction of the plate $c$. There is one of said levers L for each of the ways $e$, and the lower end of each lever plays between the lug $i^5$, connected with the mechanism of the movable or sliding shelf $i$ and the adjacent side of the front plate $c$, as shown most clearly in Figs. 5 and 11 and 31. The lower end of each of said levers L is also in movable connection at $L^2$ with the upper end of a rocking link $L^3$, and the lower end of said link is in turn in movable connection at $a^3$ with the rocking arm $a^2$ of the set of clutch devices belonging to the adjacent way of the next higher denomination. The links $L^3$ are supported on a rod $L^{30}$, extending across the machine. Thus it will be seen that with each complete stroke of the main operating crank-handle J the levers G G' are swung on their pivots or fulcrums, and at the same time the said levers L are also swung or turned back and forth on their pivots $L^2$, which normally constitute the working fulcrums for the levers. This movement occurs at each complete stroke of the handle J as long as there are no movable tally-pieces B in the path of movement of the sliding or reciprocating plugs $l$, and at each such stroke these plugs are also moved in and out of their guides and into the ways $e$. Now whenever the column of tally-pieces on any one of the movable shelves $i$ reaches a height equal to or extending above the path of movement of any one of the sliding plugs $l$ the particular tally-piece in line with the plug is caught by the plug on its next forward stroke or movement, and said tally-piece is thus pinched between the end of the plug and the adjacent side of the face-plate $b$. This results in preventing the lower end of the corresponding lever L from swinging on its fulcrum $L^2$, but does not prevent the lever from turning on its central pivot $l^4$, mounted on the part $l^2$, and which now becomes the working fulcrum for said lever. The effect now is that the lower end of the lever L is carried inward on the forward stroke of the handle J, and the upper end of the link $L^3$ is carried therewith, while at the same time the lower end of said link moves forward and carries with it the arm $a^2$ on the hub of one of the clutch members of the next or higher denomination. This movement of said arm moves, diminishes, or lowers the next adjacent indicating-column of tally-pieces of higher denomination to the extent of one tally-piece by turning the pocket-wheel of the next higher denomination to the extent of one tooth, and hence one tally-piece in the column of the higher denomination is forced into the bottom of the rear way and another tally-piece drops from the highest portion of the same endless guideway upon the projecting plug $l$ of that way, and thus the carrying of the desired tally-piece is accomplished. It should be noticed that the indication of the added unit in the higher denomination is produced by the movement, diminution, or lowering of the indicating-column of said higher denomination. On the next backward or return motion of the operating-handle J the plug is withdrawn and this carried tally-piece drops down upon the tally-piece B' or upon the tally-pieces constituting the accumulating column already resting on the shelf $i$, where it remains until released to be conveyed to the indicating-column below in the manner to be described. Simultaneously with this carrying operation all the tally-pieces of the first or lowest denomination which are below the pinched tally-piece $B^2$ (see Figs. 5 and 10) of that denomination are by the withdrawal of the sliding shelf $i$ by the movement of the lever L on its fulcrum $l^4$ dropped from the accumulating-column X' (see Fig. 10) in the particular way $e$ belonging to said denomination and into that part of said way devoted to the indicating-column X. (See Fig. 10.)

Beside each of the ways $e$ is a scale-plate O, (see Fig. 10,) having indicating-numerals arranged in consecutive order downward and beginning with "0" at the top and ending with the number "9." Normally the indicating-column X of each way comprises ten tally-pieces B, one for each decimal from "1" to "9" and an additional tally-piece $B^3$ in the column opposite the scale, which tally-piece $B^3$ is the tenth in the column and completes or restores the full height of the column (in a decimal system) up to the shelf $i$, as is obvious from the description already made. Normally, also, there is a working piece B' resting on each of the sliding shelves $i$, as already mentioned. Now, for example, suppose it is desired to add together the values eight and nine of the first or units column, which is of the cents denomination. By first manipulating the key mechanism in a manner corresponding in value to eight the devices are set into operation as desired by means of mechanism still to be described, whereby the first or units column is moved, diminished, or lowered to the extent of eight tally-pieces B, including the zero tally-piece $B^3$, and at the same time eight tally-pieces are forced up in the rear way $e'$ and over through the arched way $f$ and run down into the upper part of the same way $e$ and are caught and held temporarily upon the tally-piece B' on the sliding shelf $i$ of said way. After this is done the key mechanism is operated correspondingly to the value nine, whereupon the indicating-column in the way is completely emptied and nine tally-pieces are similarly carried over at the upper part of the way, as before. The indicating-column is thus moved, diminished, or lowered to the extent of seventeen (eight plus nine) tally-pieces, and the top of the column is a distance below the maximum reading of the scale equal to seven tally-pieces. On the next forward movement of the handle J the eleventh tally-piece $B^2$ of the upper accumulating-column above the shelf $i$ is pinched or caught by the plug $l$, as already explained, and there now being ten tally-pieces below this pinched piece and seven tally-pieces above it said ten tally-pieces are dropped into that portion of the way $e$ appropriated to the indicating-column X by the inward movement of the shelf $i$, which occurs simultaneously with the pinching of the working base (tally-piece $B^2$) of the upper column. On the backward stroke of the handle J the plug $l$ releases the tally-piece $B^2$ which it has been pinching, and said tally-piece with the seven tally-pieces above it are dropped upon the now protruding shelf $i$. The ten tally-pieces dropped into the indicating-way form a column X in said way reaching opposite to the numeral "7" on the indicator O, and inasmuch as the indicating-column X of the next higher denomination is at the same time moved, diminished, or lowered to the extent of a tally-piece the tally-pieces in the second indicating-column register "1," thus reading "17" by the two columns as the total of the two values (eight and nine) added together. Thus the transferring operation takes place on the downward stroke of the handle and the ordinary registration by the movement of the balls into the ways $e$ takes place upon the return upward stroke of the handle, so that in this way the ordinary registration does not conflict with the transferring operation. After the addition of two or more values it requires a complete independent stroke of the operating-handle to effect the carrying operation; but as many values may be added together as desired indefinitely. With each accumulation of ten tally-pieces in the upper column X' (additional to the working tally-piece $B^2$) it is clear that a carrying of one tally-piece from and in the next adjacent indicating-column takes place. It will thus be observed that there are certain cases where the amount previously registered is such that even if no further amounts were to be registered the handle should, however, be operated enough times to effect all the necessary transfers. Thus if the machine reads "999" and one is added, then there will be ten balls in the units-column above the shelf $i$, as is shown, for example, in Fig. 10 in the next to the highest column; but the scale-plate $o$ of this units-column shows that the balls have been exhausted below the "9" reading and the top ball does not stand opposite any numeral, therefore indicating that the handle should again be operated to effect the transfer, and when this transfer to the tens-column has taken place a similar condition will be observed in the tens-column, so that the handle should again be operated to effect a transfer to the hundreds-column, and likewise still another operation of the handle to transfer to the thousands-column, whereupon the machine will then correctly indicate "1,000." In order to permit only the exact number of tally-pieces to be forced through the arched ways $f$, as well as to prevent any of the tally-pieces being carried over by momentum, I provide a series of springs $h^4$, each of which is fastened at one end to a stationary part of the machine with its free end turned or bent downward to enter the way. These springs play over the tally-pieces as they are forced through the way, and their ends drop down behind the last tally-piece discharged from the ways.

In order to reset the movable tally-pieces at any time by discharging the pieces from the accumulating columns X' to the indicating-columns X, I provide a series of movable keys P, which work through the front of the frame $A^0$ and beneath the frame $a$, surrounding the face-plate $b$. These keys work in spaces between the ways $e$, and each one at its inner end is in movable connection with the lower end of a vertical lever P', the upper end of which lever normally rests against the side of the lug $i^6$, and whenever any one of said keys P is drawn out the lever P' corresponding thereto moves the slide $i$ inward and any balls above the slide drop down into the indicating-way. As soon as the key P is released the corresponding spring-plate $i^7$ on the back of the rear plate $g$ again forces the slide outward, and it always comes between the highest two pieces B in the column to support the tally-piece B' above the "0" on the scale O.

On reference to Fig. 10 it will be seen that the tally-pieces B are in position to indicate the total amount in the lower columns X by means of the scale-plates O, with the exception of the next to the highest column, as pointed out above, in which column it will be noticed that the balls have sunk below the "9" reading in the X column, while ten balls are contained in the upper column X', showing that the handle should be again operated to effect the transfer if it is desired to get all the readings from the scale-plates O, and after this has been done the next to the highest column X will read "0" and a transfer will have occurred to cause the highest column to indicate "1," so that the reading of the machine will then stand at "105,871,345," which in dollars and cents would indicate $1,058,713.45.

It is obvious from the foregoing that various changes can be made in the general construction and arrangement of the register or indicating mechanism, and hence I am not limited to details thereof.

The second part of my invention comprises a key mechanism, a setting mechanism coöperating with the key mechanism, and an operating mechanism for producing the movements of the setting mechanism for operating the registering mechanism in correspondence with the operation of said key mechanism. The operating mechanism is common to the indicating and setting mechanisms, as well as to the printing and other mechanisms to be described; but said operating mechanism will be referred to at this point only in connection with the said key and setting mechanisms. The specific form of key mechanism herein set forth comprises keys which are arranged in banks representing different denominational values, and each bank corresponds to a registering mechanism consisting in the present case of an indicating-column and an accumulating column of movable tally-pieces. Thus nine keys may constitute a bank, and said keys in a decimal system may represent consecutive numeric values ranging from one to nine inclusive, and each of said keys corresponds to an equivalent value indicated by the tally-pieces in the corresponding indicating-column. Inasmuch as the upper tally-piece of each of the indicating-columns always indicates zero at normal, it is obvious that there is no necessity for having a separate key or actuating device for "0" or zero.

I will first describe the key mechanism and its several connections, and then I will proceed with a description of the operating and setting mechanisms in their order. Thus the key mechanism comprises in the present instance a set of keys E, arranged in different banks, the keys of each bank representing in numeric order values which correspond to equivalent values adapted to be indicated by movable tally-pieces in the corresponding indicating and accumulating columns X and X' of the indicating and registering mechanism. Each of said keys has a finger-piece or button E' and a shank $E^2$, Fig. 6, the latter passing down through a suitable opening or slot in a top plate $A^{10}$ of a box or casing S, which incloses the key-levers $E^4$ and their connections. The key-levers $E^4$, although of different lengths according to the distances of the keys E from the mechanisms to be operated by the key-levers, are adjusted to impart uniform movements to corresponding parts of the setting mechanism to be described, and accordingly as the keys increase in value in each bank the levers increase in length, and the levers and keys are graduated in arrangement and as to their fulcrums, so as to permit the proper operation. The levers $E^4$ are movably supported on rods $E^5$, having suitable bearings in the frame of the machine, and thus when any one of the keys is depressed the corresponding lever is also depressed at its outer end and elevated at its inner end, as shown in dotted lines in Fig. 6. Normally the inner ends of the key-levers rest upon a stop-rod $E^6$ passing through the machine beneath the levers, and said inner ends of the levers are normally depressed, thus maintaining the keys in an elevated position. The stop-rod $E^6$ acts to limit the downward movement of the inner ends of the levers when the keys E are restored to their upper positions, and the levers have a substantially uniform upward movement at their inner ends.

The actuating devices of the mechanism comprise cam-wheels I I' (see Figs. 2, 9, and 13) at the sides of the machine, which are carried by the main operating-shaft Q, at or near the ends of the latter, and this shaft Q is arranged below and somewhat in front of the shaft C of the pocket-wheels D, referred to above. The shaft Q carries a series of short sleeves $t$, (see Figs. 6 and 30,) each of which is formed on one side of a gear-wheel T, (the driver or actuator of the indicator mechanism,) and said sleeves constitute practically independent extended hubs for said gear-wheels, which reach from one wheel to the adjacent side of the next wheel of the series. Also fitting upon the shaft Q and passing through all of the said sleeves or hubs $t$ is a stationary sleeve $t'$, Fig. 6, for receiving the wear caused by the turning of the gear-wheels back and forth, as well as by the rocking of the shaft Q in the manner to be described. Each of the gear-wheels T has at one point in its periphery a raised cam T', and each wheel is also formed with an arc-shaped slot $t^2$ at its upper part, which slots are concentric with the axis of the shaft Q. Each wheel is likewise provided on its face with a pin $t^3$, (see Fig. 3,) which reaches from its own wheel to the adjacent side of the next wheel, and as said wheels are carried back and forth said pins are carried with them. Each of said gear-wheels T also carries another pin, $t^4$, which is parallel with the pin $t^3$, and the said pins $t^4$ are arranged directly beneath and in line with the axis of the main shaft Q. It will thus be seen that the pins $t^4$ are also moved with the respective gear-wheels. The arc-slots $t^2$ of the gear-wheels are in line with each other, and passing through these slots from side to side of the machine is a stationary stop-bar $T^2$, secured at one end by means of a screw $T^3$, Fig. 1, entering a block $T^4$ on the side of the frame A and at the other end secured in a similar support or in any other suitable manner at either end. Said stop-bar limits the backward movement of the said gear-wheels as well as the forward movement of the setting-plates to be described. Passing through the whole series of arc-slots $t^2$ is a movable bar $T^5$, which at the ends also passes through a similar concentric slot $T^6$, Fig. 2, in each of the ends of the frame A. The forward ends of said slots $T^6$ limit the forward movement of said movable bar. Normally or when the operating-handle J is in its upward position said movable bar $T^5$ rests at the rearward extremity of the slots $t^2$ and $T^6$, and the ends of the bar are fastened to the main operating cam-wheels I I', so as to be moved when said wheels are operated. Said movable bar $T^5$ is for the purpose of operating or moving the plates of the setting mechanism to be described, and set into the rear edge of said bar is a longitudinally-movable shoe $T^{50}$ for engaging other parts to be described. The teeth of each gear-wheel T are in mesh with the gear-teeth $q'$ on the periphery of the corresponding driving member or gear-wheel $q$ of a clutch device employed in connection with the pocket-wheels D of an indicator mechanism. Each time any one of said gear-wheels T is moved forward and back the said driving clutch member is correspondingly moved and the pocket-wheels are operated thereby in an obvious manner.

I provide also a setting mechanism for each indicating mechanism which determines the movement of the indicating mechanism while these movements are produced by the actuation of the operating mechanism. Intermediate devices of suitable character, such as the gear-wheels and pocket-wheels, are interposed between the setting mechanism and the indicating mechanism for operating the latter correspondingly with the former. This setting mechanism comprises for each indicating mechanism a series of movable elements corresponding to the different key values of the key mechanism appropriated to that indicating mechanism, each of said elements being adapted to be projected by the key mechanism into a different position in the path of the operating mechanism from that of any other element in the same series.

The setting mechanism for effecting the desired extent of movement of the gear-wheel T, and consequently of the wheels D, is composed of a series of plates U, (see Fig. 31,) each of which is formed with an upper engaging portion U', being practically rectangular in shape, and these portions are graduated in angular position from the stop-bar $T^2$ in proportion to the values represented by the corresponding operating-keys. There is a set or series of these plates for each bank of keys, and each set or series, therefore, comprises nine plates, there being one plate for each key. In order to keep the plates sufficiently far apart for independent vertical action, washers are arranged between said plates. Each plate is formed with a vertical slot $u$ to permit the plate to move vertically with respect to the shaft Q, which passes through said slots, and each plate is also provided with an additional slot $u'$ beneath the slot first mentioned. Passing through the slots $u'$ of the plates U of each series is the pin $t^4$ on the particular gear-wheel T belonging to that series, and normally the upper edges of the slots $u$ and $u'$ rest upon the sleeve or hub $t$ and upon the pin $t^4$, respectively. It is evident that each plate is thus movable to a limited extent vertically or transversely with reference to its axis, and it will be seen also that whenever the machine is operated after a plate of one of the series has been elevated the movement of said plate actuates the gear-wheel through the pin $t^4$. The plates of each series are thus non-revoluble with reference to each other because of the pin $t^4$, but are revoluble about the shaft Q. The lower part of each of said setting-plates U is provided with a forwardly and upwardly projecting cam $U^2$, the lower edge or cam-surface $u^2$ of which is struck on a circle concentric with the axis of the shaft Q on which said plates are turned; but when the plates are down to the full extent permitted by their slots the said cam-surfaces $u^2$ rest upon projections $E^{10}$, Fig. 6, on the inner ends of the key-levers $E^4$, and the surface $u^2$ becomes eccentric to the shaft Q, as shown in the full lines in Fig. 6. Whenever any one of the operating-keys E is depressed, the inner end of the corresponding key-lever is elevated or thrown upward, and by the engagement of the projection $E^{10}$ of that lever with the curved cam-surface $u^2$ of the corresponding cam $U^2$ on the setting-plate the said plate is raised to the position shown in Fig. 6 in the regularly-broken lines. When this is done, the operating-bar $T^5$ is also carried forward in the direction shown by the arrow in Fig. 6 by the operation of the handle J and its cam I, to which said bar $T^5$ is connected, and when the forward edge of this bar $T^5$ engages the rear edge of the projecting portion U' of the raised setting-plate the said setting-plate is also carried around with the bar until the forward edge of the portion U' strikes the stop-bar $T^2$. (See irregularly dotted lines in Fig. 6.) As already stated, all the setting-plates of that particular series are also carried around with the raised plate until the bar $T^5$ reaches the limit of its forward movement. The said bar $T^5$ has a definite movement both forward and back, and whenever the bar pressing against the rear edge of the projecting portion U' of a setting-plate carries the plate forward the forward edge of the projecting portion U' is carried against the stop-bar $T^2$. Thus each plate U when raised permits a definite forward movement of the set or system of plates and of the gear-wheel T; but the raising of different plates permits different degrees of movements of said gear-wheel. By forcing the operating-handle J backward, the movable bar $T^5$ is carried back, the operated setting-plate is returned to place in the series, and the whole series is carried back with the corresponding gear-wheel T to the initial position, the manner of turning the wheels T back to normal position being later described. In order to engage a setting-plate to hold it in position when raised, I employ a suitable catch device or latch which for reasons to be explained I make, preferably, a double catch. Thus the rear vertical edge of each plate U is provided with a lug or shoulder $u^3$ and a similar lug or shoulder $u^4$, the two being a short distance apart. Carried by a pin $t^4$ on the side of the gear-wheel T of each series of setting-plates is a double-acting or two-part dog V. The parts V' and $V^2$, Fig. 8, of said dog operate independently to some extent, although so operating to catch and engage the setting-plate. The said first part V' is provided with a tailpiece $v'$ and is normally acted upon or pressed inward toward the plate by a spring $v^{10}$, and the said second part $V^2$ is also normally pressed inward toward the plate by means of a spring $v^2$, carried by said first part V'. This double-acting or two-part dog V is of width equal to the spaces between the gear-wheels, and consequently but a single one of said dogs is employed for each series of setting-plates. The operation of the dogs in engaging any one of the plates of a series when raised is as follows: Normally the lower end of the part $V^2$ of the dog is at the position indicated in Figs. 5 and 6—that is, in a position to engage the lug or shoulder $u^3$ on the plate when the latter is raised. Now this engagement of the part $V^2$ of the dog takes place as soon as any one of the plates of a series is raised—that is, when a key is depressed and the plate U is thereby raised the shoulder $u^3$ forces back the spring-pressed part $V^2$ and is then caught and held up by said part $V^2$ in the manner shown in dotted lines in Fig. 6, in which position the upper shoulder $u^4$ is slightly above the level of the part $V'$. The position of the upper part $V'$ of the dog is also shown in Figs. 5 and 6. As soon as the movable bar $T^5$ is started to be moved by the operating-handle J the said bar is lifted from the tailpiece $v'$ of the part $V'$, whereupon the spring $v^{10}$ immediately throws the said part into engagement with the lug or shoulder $u^4$, and the construction of the part $V'$ of the dog is such, as shown in cross-section in Fig. 7, that the cut-away portion $V^5$, which bears against the hinge portion $v^6$ of the part $V^2$, is so flattened against the inner side of said hinged portion that when the part $V'$ is forced inward by the spring $v^{10}$ to engage the shoulder $u^4$, as above described, this flattened portion $v^5$ so presses against the hinge portion $v^6$ that the part $V^2$ is thereby forced outward, thus withdrawing the part $V^2$ from engagement with the shoulder $u^3$ and allowing the plate U to drop slightly until the shoulder $u^4$ rests upon the part $V'$, and this slight dropping of the plate U is just enough to drop the shoulder $u^3$ below the level of the hooked end of the part $V^2$, so that when said part $V^2$ is returned to normal position upon the unlatching of the plate U, as later described, this hooked end will not engage the shoulder $u^3$, and the plate can therefore return to normal position. It may be mentioned that the above-described flattened portion is such as only to cause the part $V'$ to positively move the part $V^2$ outward when the part $V'$ is moved inward to engage the shoulder $u^4$, and the part $V^2$ may move outward independently of the part $V'$, but of course against the tension of the spring $v^2$, which spring returns the part $V^2$ to normal position when the part $V'$ is moved outward to unlatch the plate U, as later described. At the same time that the said part $V'$ is moved under the shoulder $u^4$ it also is carried against the rear edges of all the plates of the series, and as the series, as well as the gear-wheels T for that series, are moved around by the movable actuating-bar $T^5$ the dog is carried with them. As the said bar $T^5$ is carried back the elevated plate U is unlatched as soon as the bar in its return or negative movement strikes the tailpiece $v'$, and then the dog and the entire series of plates are moved back to their initial positions. Since the dogs which carry these tailpieces $v'$ are themselves mounted upon the gear-wheels T, it will be apparent that the tailpieces $v'$ are moved to different positions upon the downstroke of the handle T, according to the amount of movement imparted to their respective gear-wheels T by the operating-bar $T^5$, and upon the return of the bar $T^5$ the lower end of the bar contacts in turn with the various tailpieces $v'$, according to their positions, and the pressure of the bar on said tailpieces first rocks the part $v'$ backward to free said part from the shoulder $u^4$, and thus unlatch the plate U, and the continued pressure on the tailpiece forces the same against a stop-pin $v^7$, (shown in Figs. 5, 6, and 7,) carried on the adjacent gear-wheel T, and thus positively returns said gear-wheel to initial position by the continued movement of the bar $T^5$ to normal position. It will be understood that the upper part $V'$ of the dog is really the working dog, while the lower part $V^2$ is an additional dog for holding the plate $u$ up until it is engaged by said upper part. In order to maintain each setting-plate U in true vertical position with reference to the projection $E^{10}$ of its corresponding key-lever $E^4$, I employ suitable guide-strips $e^{10}$, Fig. 6, embracing the sides of the plates and secured to the ends of said levers. These strips prevent the plates from springing or moving sidewise.

The pin $t^3$, carried by each of the gear-wheels T, serves as a support for the upper ends of a series of springs $t^{30}$, one for each of the setting-plates U, and each spring bears upon a plate U, tending to press it downward into its normal or unoperated position. Whenever a setting-plate is moved upward, it is moved against the tension of its corresponding spring $t^{30}$, which then is compressed, and then as soon as the tailpiece $v'$ of the upper part $V'$ of the movable dog V is moved by the forward edge of the movable bar $T^5$ the catch is disengaged from the plate and the spring is released and acts by expansion to restore the plate U to normal position.

As already stated, whenever any one of the key-levers $E^4$ is operated the corresponding plate U is raised and is latched in its raised position. Now as the whole series of said plates is moved forward by the movable bar T the cam-surface $u^2$ of the particular plate operated rides upon the projection $E^{10}$ of the lever $E^4$, and inasmuch as the said cam-surface $u^2$ is raised into a circle concentric with the axis on which the plate is turned the inner end of the lever may remain raised. As soon as the dog referred to is disengaged from said plate the plate is pushed down again by its spring $t^{30}$, and the inner end of the lever is therefore depressed and the corresponding key is elevated, this latter operation being effected by the gradually-increasing radius of the cam-surface of the cam $u^2$, pushing the lever down as the cam is carried forward by its plate.

In order to provide for a full stroke of the operating crank-handle and to prevent the same from being turned back from any intermediate point after it has been started in either direction, and thus to compel a complete operation of the machine, I provide a series of ratchet-teeth I¹⁰, Fig. 2, on the upper edge of the main operating-cam I, and at points corresponding to the limits of the forward and backward movements of the shaft Q and handle J, I provide on the side of said cam the lugs or pins $i^{10}$ and $i^{11}$. Pivoted in a bracket I²⁰, secured to the outer side portion of the supporting-frame A, is a double-acting pawl or dog $i^{20}$, which has a V-shaped edge $i^{21}$ and which also has a tailpiece $i^{22}$, which is alternately engaged by the lugs or pins $i^{10}$ and $i^{11}$ on the cam I. The pawl or dog $i^{20}$ is constantly acted upon by a spring $i^{23}$, secured at its lower end to the bracket I²⁰, and when the cam I is carried around by the forward movement of the handle J the lower part $i^{24}$ of the pawl will pass over the ratchet-teeth I¹⁰; but if it is attempted to return the handle before it is carried to the limit of its stroke the said part $i^{24}$ engages the ratchet-teeth and prevents such return movement. When the cam and handle are carried to the forward limit of movement, the pin $i^{11}$ on the cam strikes the tailpiece $i^{22}$ and shifts the pawl, and the upper part $i^{25}$ of the pawl acts in a similar manner to the first part. When the handle is carried back its full limit, the pin $i^{10}$ strikes the tailpiece and again shifts the dog back. The spring $i^{23}$ has a beveled end, which operates against the sides of the angular shoulder $i^{21}$ of the dog in the manner of a click, and the spring thus holds the dog in proper position each time it is shifted. The dog is provided with a pin passing through the bracket and is provided with a handle I³⁰, Fig. 1, by which the engagement of the dog with the ratchet-teeth may be released and changed at any time by moving the handle in the proper direction.

From the foregoing it will be seen that each pocket-wheel $d$, as well as its coöperating mechanism, has a definite positive movement when set in operation and also that the bar T⁵ has a complete oscillation about its axis with each operation of the machine. Each setting-plate has also its own definite positive movement which determines the extent of the movement of the gearing and pocket-wheel belonging thereto. There is no undue shock when the machine is operated, and all the parts of the machine are so assembled and organized as to produce precision and accuracy in the performance of the required functions.

The third part of my invention comprises a printing mechanism for printing upon a record-strip suitable numeric values corresponding to the values represented by the key mechanism. This printing mechanism is set by the setting mechanism above described and is actuated to produce its functions by the operating mechanism hereinbefore set forth. Intermediate devices between the indicating mechanism and the setting mechanism are above set forth, and connections between these intermediate devices and the type-carriers are used to set the latter correspondingly to the former. In the form of device shown there is one type-carrier for each key mechanism or bank of keys and for a setting mechanism. The operating mechanism is common to the registering and printing mechanisms. This printing mechanism can be altered in many of its details, and hence it is understood that I am not limited in this respect.

Corresponding to the first four banks of keys, counting from the right, are four longitudinal shafts A¹⁰, (see Fig. 5,) which are arranged at the back of the machine and each supported at one end in the side plate of the interior supporting-frame A and at the other end in the outer side A¹¹ of the printer-frame. Each of said shafts is provided with a gear-wheel A¹³, and these gear-wheels correspond in order to the first four gear-wheels T, beginning also at the right, and each gear-wheel A¹³ is in gear with its respective gear-wheel T. The highest one of said shafts and its gear correspond to the first bank of keys. The next shaft below and its gear correspond to the second bank of keys, and so on. (See Figs. 9 and 5.) Similarly supported at the front of the machine are four additional shafts A¹⁴, each of which is provided with a similar gear-wheel A¹⁵, arranged to correspond in regular order with the four remaining gear-wheels V of the four remaining banks of keys. (See Figs. 5 and 12.) The shafts A¹⁰ are each also provided with a gear wheel or pinion A¹⁶, (see Fig. 12,) each of which is in mesh with a larger gear-wheel A¹⁷, supported loosely between collars A¹⁸ on a shaft—as, for instance, on an extension of the main shaft Q, above referred to. In like manner the four additional shafts A¹⁴ at the front of the machine are each provided with a similar gear wheel or pinion A¹⁹, each of which in consecutive order from the right is in mesh with another larger gear-wheel A¹⁷, supported in the same manner with the first, as on the extension of the main shaft. Thus it will be seen that after any one of the keys of the first four banks is operated the gear-wheel T of the setting mechanism of that particular bank is turned to a corresponding extent upon the forward movement of the handle J, and the shaft A¹⁰ corresponding to that bank of keys is rotated and the corresponding gear-wheel A¹⁷ is also correspondingly rotated through the connections described in an obvious manner. Also after any one of the keys belonging to any of the last four banks is operated the corresponding gear-wheel T thereof is also operated in substantially the same manner through the connections described, and consequently the corresponding gear-wheel $A^{17}$ is correspondingly rotated. It is therefore clear that the number of gear-wheels $A^{17}$ equals the number of banks of keys. Each of the said wheels $A^{17}$ is also in gear with the gear-teeth $A^{119}$, formed in a part of the circumference or periphery of one of a series of oscillatory type-carriers or type-plates $B^{10}$, each of which plates is also provided for a part of its circumference or periphery with a series of notches $B^{11}$, separated by elongated teeth $B^{12}$, the ends of which are preferably beveled on each edge, so as to facilitate the entrance of a portion of a locking-bar, to be described. These notches $B^{11}$ are equal in number to the number of keys in any bank, with an additional notch for zero. The lower front portions of the said type carriers or plates $B^{10}$ are conveniently cut off, as by the chord $B^{13}$, and the lower portion or periphery of each plate is extended to a greater radius or pitch-line $B^{14}$, which is concentric with the axis on which the plate swings, as well as with the remaining parts of the wheel. On the edge of this concentric extended portion the type $B^{15}$ are arranged, from which impressions are received on a paper strip, as hereinafter described. Each type-carrier is adapted to print numerals relating to a particular denomination and is connected to and is set by one of the setting mechanisms hereinbefore described. The type on each type-carrier begin with "0" and end with "9," and normally all the type-plates are set in position to print zero. Whenever a key of any one of the banks of keys is depressed and the handle J carried downward, the larger wheel $A^{17}$, corresponding to said bank, is correspondingly rotated in the direction indicated by the arrow in Fig. 12, and by reason of the intermeshing of said wheel with the teeth $A^{119}$ of its type-plate $B^{10}$ the said plate is turned on its axis to bring the type corresponding in value to the key depressed in position for printing upon a record-strip to be referred to. In order to hold the entire set of type-plates firmly in position to prevent blurring in the impressions made on the strip of ribbon, I employ a suitable locking device, which on each forward or downward stroke of the handle J is carried down to engage the notches $B^{11}$ of the said type-plates and which on each return or backward stroke of said handle is carried up out of such engagement. This locking device consists of a bar or strip $C^{10}$, extending across and above the type-plates and normally in position to engage notches $B^{11}$ of the plates $B^{10}$. Said bar or strip is preferably beveled on its lower edge in order to enter readily into any of the notches $B^{11}$, and the bar or strip is carried by a swinging frame $D^{10}$, supported on pivots $C^{12}$ in the sides of the printer-frame $A^{11}$. Said carrying-frame $D^{10}$ is provided with an extension $C^{13}$, (see Figs. 13, 14, and 15,) which carries a dog $C^{14}$, the end of which extends to the edge of the operating-cam $I'$, which cam at a point corresponding to the downward position of the swinging frame $D^{10}$ and locking-bar $C^{10}$ is provided with a notch $C^{15}$, the lower side of which is beveled at $c^{16}$. On the shaft Q and normally held in the position indicated at Fig. 13 against the action of the spring $C^{16}$, carried by the cam, is an arm $C^{17}$, the end of which extends partly alongside the notch $C^{15}$ and rests against a stop-pin $c^{17}$. The extension $C^{13}$ of the swinging frame $D^{10}$ is constantly acted upon by a spring $c^{170}$ to press against the edge of the cam $I'$, and consequently when said cam is carried around forwardly by the handle J the dog $C^{14}$ is forced into the notch $C^{15}$, as shown in Fig. 14, and in this way the cam $I'$ and frame $D^{10}$ are interlocked, the movement of the extension and its dog having carried the swinging frame $D^{10}$ downward, with the locking-bar $C^{10}$ entering the notches $B^{11}$ in line therewith. The dog $C^{14}$ when it enters the notch $C^{15}$ passes over the top edge of the arm $C^{17}$; but on the return movement of the cam (in the direction of the arrow marked 1 in Fig. 14) the dog bears downward on the said arm $C^{17}$, compressing the spring $C^{16}$, and thus the said dog leaves the notch $C^{15}$ by moving along the beveled side $c^{16}$ of said notch. By reason of the end of the dog being now acted upon by the curved edge or surface of cam $I'$ the extension $C^{13}$ of swinging frame $D^{10}$ is carried back, thereby swinging the said frame upward and releasing the locking-bar $C^{10}$ from the notches $B^{11}$ of the type-plates. Said swinging frame $D^{10}$ also operates the feed devices for the printing-ribbon, as hereinafter described.

The extension $C^{13}$ of the swinging frame $D^{10}$ is in movable connection at $D^{11}$ with the upper end of a movable link $D^{12}$, which is mounted at its lower end on a rock-shaft $D^{13}$, on which latter is rigidly held or supported a pressure mechanism or striker-frame $E^{10}$ for producing the printing impression and hereinafter described. When the extension $C^{13}$ is carried inward by the spring $c^{170}$ (in the direction of the arrow marked 2 in Fig. 14) and the dog $C^{14}$ enters the notch $C^{15}$ in the cam $I'$, the upper end of said link $D^{12}$ is also carried in the same direction with the extension, and this shaft $D^{13}$ is thus rocked to carry the striker-frame $E^{10}$ upward. Said frame $E^{10}$ is also carried down on the return of the link to its first position. In connection with this striker-frame, together with the series of type-plates $B^{10}$ and the printing-ribbon $F^{10}$, I employ an individual movable platen for each type-carrier and the corresponding key-bank. Immediately after the setting of any one of the type-plates into position to make a type impression a platen is moved up to meet the type to make the impression on a paper or upon a strip $X^{10}$, which is fed from a roll $X^{11}$, (see Fig. 9,) mounted at the side of the machine, on a spindle $X^{12}$ and is retained in place by a removable plate $X^{13}$ on the outer end of said spindle, which is held thereon by means of the thumb-nut $X^{14}$. The construction and arrangement of the individual platens, together with the means for operating the same, are shown in Figs. 12 to 20, inclusive. Thus $G^{10}$ represents a stationary frame secured to the front of the printer-frame, and sliding vertically in this frame $G^{10}$ are a number of movable platens $H^{10}$, the operating-heads $H^{11}$ or surfaces of which rest normally upon the top of the frame, and each of the said platens comprises a stem extending down through guides in a lower portion $G^{11}$ of the frame and an upper portion $G^{12}$. As already stated, there is a movable platen for each type-plate, and coöperating with the series of platens is a series of operating-bars $I^{10}$ therefor, each bar of which is provided at its inner end with a block or lug $I^{11}$ on its upper surface for engaging the lower end of the corresponding movable platen whenever the bar is moved lengthwise to bring the block in line with the stem of the platen and is then carried upward by the lifter or striker frame $E^{10}$. Normally the bars $I^{10}$ are held inward, thus carrying the blocks $I^{11}$ beyond the stems of the movable platens by springs $i^{10}$ and $i^{11}$, Figs. 5 and 20, as hereinafter described. The said operating bars at or near their inner extremities are supported and guided in their movements between strips $I^{12}$ and $I^{13}$ of the lifter or striker frame $E^{10}$, and at a suitable part of its length each of said bars is provided on opposite sides with engaging lugs $I^{15}$ and $I^{16}$. Referring to Figs. 17 and 19, it will be seen that said bars are spaced in accordance with the spacing of the type-plates, and it will also be seen that the outer bars of the series have no lug or shoulder corresponding to those $I^{15}$ and $i^{16}$ of the intermediate bars, respectively. The bars correspond, respectively, to the eight banks of keys herein employed, and in Figs. 17 and 19 I have numbered the bars consecutively from "1" to "8." The said bars are graduated in length, as shown in Figs. 20 and 21, and, as shown in Figs. 12 and 15, the free end of each rod is provided with a slot at $I^{17}$ and is in movable sliding connection with a pin $I^{18}$ on an arm $I^{19}$, carried by a longitudinal rocking shaft $J^{10}$. There is a shaft $J^{10}$ for each bar $I^{10}$, and the arms $I^{19}$ of the shafts are graduated in arrangement to accord with the arrangement of the said bars. (See Fig. 20.) Also carried by said rock-shafts $J^{10}$ in graduated manner and in position corresponding with each of the gear-wheels T is a similar arm $J^{11}$, Fig. 5, which is in movable connection with a link $J^{12}$, the inner end of which is in movable connection with the lower end $K^{10}$ of a rocking lever $K^{11}$, carried upon the innermost shaft or rod $E^{5}$, extending across the machine. There is a corresponding lever $K^{11}$ for each gear-wheel T, and these levers are normally held outward at their upper ends by means of the cams $T'$ on the wheels, so that in consequence thereof the lower arms of the levers are carried inward and are there held against the tension of a spring $i^{11}$, secured at one end to each of the links $J^{12}$ and at the other end to a pin $j^{12}$ on the casing. While in the unoperated position, the free ends of the links are a short distance from the edge of a strip $j^{120}$ in the casing, and this strip is a stop for the end of each link $J^{12}$ as it is carried back by the movement of the arm $K^{10}$ of the lever $K^{11}$ under the action of the spring $i^{11}$. When any one of the keys of any bank is depressed and the handle J brought downward, the gear-wheel T corresponding to that bank is carried forward until the upper end of the lever rides over the upper edge of the cam $T'$, whereupon the spring $i^{11}$ draws upon the lower end of the arm $K^{10}$ through the link $J^{12}$ and the latter is carried back against the stop-strip $j^{120}$. This movement occurs just after the handle J has picked up the gear-wheel T in the manner hitherto described, and the movement of the link rocks the shaft $J^{10}$ corresponding thereto, which in turn, by means of the corresponding arm $I^{19}$, adjacent to the printing-plates, draws upon the corresponding platen-bar $I^{10}$, and the latter is moved outward between its guides in the striker-frame $E^{10}$ to an extent to bring the block $I^{11}$ of said bar in position beneath the stem $H^{11}$ of the corresponding movable platen $H^{10}$. The said platen-bar is drawn forward upon a very slight movement of the gear-wheel T in the forward stroke of the handle J, and the same movement of said handle operates the cam $I'$, and this latter operates the extension $C^{13}$ of the swinging frame $D^{10}$ in the manner already described, whereat the shaft $D^{13}$ is rocked by the movement of link $D^{12}$, and the striker-frame $E^{10}$ is thus carried upward, and the block $I^{11}$ on any bar $I^{10}$ elevates the corresponding platen after its printing-plate $B^{10}$ has been set in position for printing. Thus it will be evident that each block $I^{11}$ is operated upon each operation of the setting mechanism with which it is connected by the lever mechanism of which the lever $K^{11}$ is part, and it may be stated that when the striker-frame is actuated all the platen-operating bars and blocks are also lifted; but the only block in an operative position to move a platen is the one which has been drawn out by the rocking of shaft $J^{10}$, except certain other blocks which are also moved by this operated block in the manner to be described. A spring-plate $M^{10}$ serves to press the striker-frame normally upward in the position shown at Fig. 14, and it will be seen that normally the striker moves without producing any effect on the platens $H^{10}$, because the movement of the striker is insufficient to lift the bars $I^{10}$ high enough to move the platens unless one or more of the blocks $I^{11}$ are interposed between the striker and the lower ends of the platens. The extent of movement of the striker depends upon the length of the dog $C^{14}$ or the depth of the notch $C^{15}$ in the cam $I'$.

The return movement of the handle J restores all the parts to their initial positions. By reason of the engaging shoulders $I^{15}$ and $I^{16}$ on the platen-rods $I^{10}$ whenever any key in the first bank is depressed and the handle J is operated the platen-bar 1, Figs. 17 and 19, and the first type-plate $B^{10}$ will be moved, the latter to set the type and the former to make the printing impression possible; but the movement of said bar 1 will not affect any of the other bars, because its shoulder $I^{15}$ is in advance of the shoulder $I^{16}$ of the next adjacent bar. Now if any key is depressed in any one of the banks to the left of the first bank then the platen-operating bar $I^{10}$ corresponding thereto is moved forward, carrying with it all the platen-operating bars to the right thereof, and thus the printing-plate corresponding to the key depressed is carried into position for printing the corresponding value, while at the same time all the movable plates to the right simultaneously print zero. This results from the fact that all the plates $B^{10}$ are normally at a position to print zero and from the engagement between the shoulders $I^{15}$ and $I^{16}$ on the bars $I^{10}$; but no printing of the zeros takes place to the left of the highest numeral for which a key has been operated, because none of the platen-bars to the left of the operated bar have been moved to interpose a block $I^{11}$ between the striker $E^{10}$ and the corresponding movable platens.

Thus I provide means for operating the platens to print zeros relating to lower denominations upon movement of any block or its setting mechanism relating to a higher denomination.

Located above the platen-operating bars is a stop $N^{10}$ for limiting the upward movement of the striker-frame $E^{10}$, (see Fig. 16,) and in order to restore all of the platen-bars at the right of any particular bar operated after any intermediate bar has been operated as above described I employ a spring $i^{10}$, (see Fig. 20,) against the action of which the platen-bars work when drawn forward or in the direction of the arrow in Fig. 19. The slotted connection $I^{17}$ $I^{18}$ between the ends of the said bars and the arms $I^{19}$ on the shafts $J^{10}$ permits the return of the bars $I^{10}$ by the springs $i^{10}$ and $i^{11}$ before the key-levers $E^4$ are returned to place by the action of the cam-surfaces $u^2$ on the plates U.

As a means for throwing the printing mechanism entirely out of operation at will and at the same time to permit the indicating mechanism to be operated I provide on the swinging frame $D^{10}$ an upward extension $D^{100}$, which passes up through a suitable opening or slot in the casing $S^{10}$ for inclosing the printing mechanism, and turning on a point $D^{101}$, secured to said casing, (see Fig. 27,) is a dog $D^{102}$, which is notched at $D^{103}$ to a depth sufficient to permit the free movement of said extension back and forth during the operation of the swinging frame $D^{10}$ and of the devices which operate the striker-frame $E^{10}$ for the platen-operating bars $I^{10}$. By holding the extension $D^{100}$ back, however, and turning the dog $D^{102}$ so as to bring a shoulder $D^{104}$ on the dog in front of said extension it is obvious that the swinging frame $D^{10}$ and the link $D^{12}$ and the connected devices are locked in the position shown in Fig. 13 and are thus prevented from actuation by the cam $I'$ in the manner already above described. To restore the printer to operative position, the dog $D^{102}$ is turned back to release its shoulder $D^{104}$ from engagement with the said extension $D^{100}$, whereupon the striker and the platen-operating bars are operated as before.

It is obvious that by increasing the thickness of the blocks $I^{11}$ the pins $H^{10}$ may be disused, and the blocks themselves may act as the platens.

As a modification of the devices for operating the swinging frame $D^{10}$ and the striker-frame $E^{10}$, as well also as of the devices for throwing the printing mechanism out of operation at will, reference is made to Figs. 22 to 26, inclusive, of the drawings. In these figures $I^{100}$ is a cam corresponding practically to the cam $I'$, already described, and in this instance the said cam is provided with an extended hub $I^{101}$ at one side, which hub is formed with a socket $I^{102}$. The cam $I^{100}$ is fast in the shaft Q. Revoluble on the shaft Q is an additional cam $R^{10}$, which is provided with a hub extended at both sides, as shown at $R^{11}$ and $R^{12}$, and fitting around the said hub $I^{101}$ of the cam $I^{100}$. Said extension $R^{11}$ of the hub of said cam $R^{10}$ is provided also with an opening $R^{13}$, which corresponds to and registers with the opening $I^{102}$ in the hub $I^{101}$ of cam $I^{100}$, and said cam $R^{10}$ is furthermore provided with side lugs $R^{14}$ and $R^{15}$, each having an opening in line with the openings in the lugs $R^{14}$ and $R^{15}$. In the openings in the lugs $R^{14}$ and $R^{15}$ in a manner to lock the hubs of the two cams together is a sliding pin or bolt $R^{17}$, which carries a spring $R^{16}$, confined between the lug $R^{14}$ and a pin $R^{160}$ on the bolt $R^{17}$, the tendency of which spring is to force the bolt or locking-pin outwardly. The supporting-frame $S^{100}$ in this instance is provided with a curved flange $S^{110}$ on the arc of a circle concentric with the axes of the cams $R^{10}$ and $I^{100}$, and this flange is notched at $S^{120}$ at a point coinciding in vertical alinement with the locking pin or bolt $R^{17}$ when the cams $R^{10}$ and $I^{100}$ are in their normal position. (Shown at Fig. 22.) The cam $R^{10}$ is formed with a cam-slot $R^{18}$, which is concentric with the axis of the cam except at the upper end of the slot, where it terminates in a notch or recess $R^{19}$, and thereby forming the cam-shoulder $r^{19}$. The dog $C^{14}$ on the extension $C^{13}$ of the swinging frame $D^{10}$ is in this instance provided with a friction-roller $c^{14}$, which moves upon the edges of said cam-slot $R^{18}$ and upon the shoulder $r^{19}$ into the notch or recess $R^{19}$. The link $D^{12}$ and its connection with the extension $C^{13}$ at $D^{11}$ is substantially the same as that already described with reference to Figs. 13 and 15, for instance. Pivoted to lugs $T^{10}$ on the inner side of the casing $S^{10}$ of the printer mechanism is a cam $T^{11}$, having a finger-piece $T^{12}$ extending up through a longitudinal slot in the casing $S^{10}$, and this cam is directly above the upper end of the locking pin or bolt $R^{17}$. When the cam is swung or turned to position to cause its cam edge $T^{14}$ to ride over the top of the pin or bolt, the said bolt is depressed against the action or tension of spring $R^{160}$, and thus the lower end of the bolt enters the coinciding opening $R^{13}$ and socket $I^{102}$ in the hub portions of the cams $R^{10}$ and $I^{100}$. In this way the two hubs are locked together, and when the cam $I^{100}$ is turned the upper end of the pin or bolt rides beneath the curved flange $S^{110}$ on the supporting-frame $S^{100}$ and maintains the connection between the shaft $Q$ and the cam $R^{10}$. A clutch device is thus constituted which when engaged actuates the swinging frame $D^{10}$ and link $D^{12}$ in the manner and for the purpose hereinbefore described. When it is desired to throw the printing mechanism out of operation, while still permitting the operation of the indicating or registering mechanism, the cam $T^{11}$ is turned to release the locking pin or bolt $R^{17}$, whereupon the latter springs up out of the socket $I^{102}$ and into the notch $S^{12}$ of the curved flange $S^{11}$, and the cam $R^{10}$ is then prevented from turning with the cam $I^{100}$, which continues to be operated each time the handle $J$ is turned.

In connection with the first set of devices for operating the swinging frame $D^{10}$ (see Figs. 13, 14, and 15) I employ a feed mechanism for the paper strip $X^{10}$, which comprises a pair of feed-rolls $U^{10}$ $U^{11}$, suitably pivoted in the printer-frame, the first of which is provided with a ratchet-wheel $U^{12}$ and either or both of which rolls may be fluted or corrugated. A swing-plate $U^{13}$ is pivoted to the frame adjacent to said rolls, and it is provided with a spring-actuated pawl $U^{14}$. Said swing-plate has also a pin in movable connection at $U^{15}$ with the end of the lower arm $U^{16}$ of a bell-crank lever pivoted to the printer-frame at $U^{18}$ and the upper arm $U^{17}$ of which is in movable connection with the link $D^{12}$ by means of a connecting plate or rod $U^{19}$. It is evident that when the parts are brought to the position shown in Fig. 14 the swing-plate is carried up so as to cause the pawl $U^{14}$ to jump one tooth of the ratchet-wheel $U^{12}$, and then when the parts are again carried to the position shown in Figs. 13 and 15 the swing-plate and pawl will move the ratchet-wheel, and consequently the rolls. The two rolls are geared together by the spur-wheels $U^{101}$ and $U^{102}$. (Shown in Fig. 15.) In this way the feeding of the paper strip is carried on intermittently. A spring-actuated pawl $U^{100}$, (see Fig. 12,) pivoted to the printer-frame and engaging the spur-wheel $U^{101}$, prevents the return or back movement of the roll $U^{10}$. The upper roll $U^{10}$ may also be operated at will by a head $U^{110}$ on the end of the roller-shaft outside of the casing of the machine.

In the modified devices included in Figs. 22 to 26, inclusive, the connecting plate or rod $U^{19}$ is dispensed with and the bell-crank lever $U^{17}$ is operated by means of lugs or pins $U^{170}$ and $U^{171}$ on the cam $R^{10}$. Stops $U^{172}$ and $U^{173}$ are also used in this instance to limit the extent of oscillation of said bell-crank lever in both directions.

As shown in Fig. 16, I employ between each pair of the printing-plates $B^{10}$ pivoted drop-plates $V^{10}$, which are pivoted at $V^{11}$ and drop down by gravity on top of the paper strip $X^{10}$, and thus prevent the paper from sticking to the type on the type-plates and also guide the forward edge of the paper while it is being inserted in the machine. Beneath the said drop-plates is a table $V^{12}$, over which the strip passes, and said table is provided with an opening $V^{13}$ to permit the passage of the movable platens as they rise to meet the type-plates. I also employ a cushion of felt or rubber $V^{14}$ to allow a yielding impact between the movable platens and type-plates to prevent any liability of the type on the type-plate cutting through the paper strip.

In connection with the printing mechanism I also employ a printing-ribbon $F^{10}$ and feed mechanism therefor. (Shown more particularly in Figs. 1, 13, 15, and 21.) Thus the said ribbon is guided at the bottom transversely over the paper strip $X^{10}$ by means of guide-rolls $W^{11}$ and $W^{12}$, held at the lower ends of vertical guides $W^{13}$ $W^{14}$ for the ribbon, and thence the ribbon extends upwardly between the flanges on said guide-rolls and over two upper guide-rolls $W^{16}$ and $W^{17}$, supported, respectively, by the upper end of guide $W^{13}$ and by a swinging arm $W^{18}$, supported by the guide $W^{14}$ and which is normally pressed outward by means of a spring to impart a yielding tension to the said printing-ribbon. If desired, a guide-roll $W^{120}$ may be provided for the ribbon, which can be an inking-roll for supplying ink to the ribbon. The printing-ribbon is fed around intermittently by means of a spring-pawl $W^{19}$, carried by a plate $Y^{10}$, that has slots $Y^{11}$ and in order to move up and down on screws $Y^{12}$, secured in the side of the printer-frame. Said plate $Y^{10}$ is in movable connection at $Y^{13}$ with a pivoted arm $Y^{14}$, which is in movable connection with a link $Y^{15}$, which is pivoted to the swinging frame $D^{10}$ and moves up and down therewith. The pawl $W^{19}$ engages the teeth of a ratchet-wheel $w^{12}$ on the roll $W^{12}$, and it is evident that as the swinging frame $D^{10}$ is elevated the plate $Y^{10}$ is carried down and the pawl moves the ratchet-wheel the extent of one tooth, which in turn imparts an intermittent and partial rotation to the roll $W^{12}$, and consequently moves the ribbon around intermittently. The same device may obviously be used in connection with the devices shown in Figs. 22 to 26.

It is often desirable in this class of machines to print the same value or series of values a number of times in succession without having to reset the registering mechanism for each operation or repetition—as, for instance, when a number of dividend or other checks of the same amount are being added together—and for this purpose I employ repeating mechanism by which the printing mechanism is made to print the same amount repeatedly for as many times as it is desired and, if desired, to repeat in like manner the actuations of the adding mechanism. Thus in Figs. 28 and 29 $Z^{10}$ represents a hub which fits around and is movable longitudinally on the wear-sleeve $t'$, which extends practically the whole length of the main shaft Q, and said hub $Z^{10}$ is provided with a circumferential groove $Z^{11}$. Fitting in an opening in the stop-bar $T^2$, hereinbefore mentioned—say at a point adjacent to the main shaft near to the printing mechanism—is a sleeve $Z^{12}$, which is threaded at $Z^{13}$ to fit in said stop-bar. Working in said sleeve $Z^{12}$ is a stem $Z^{14}$, having a knob $Z^{15}$ at its outer end, preferably provided with a pointer $Z^{16}$, Fig. 1, to indicate the position of the stem. The inner end of said stem is provided with an eccentric-pin $Z^{17}$, which enters an opening $Z^{18}$, formed radially in a yoke $Z^{19}$, which spans the hub $Z^{10}$ and fits in the circumferential groove $Z^{11}$ thereof. One of the flanges of the hub $Z^{10}$ is provided with an extended portion $z^{10}$, which reaches back and is secured to the adjacent end of the movable shoe $T^{50}$ of the actuating-bar $T^5$ by the screw $z^{11}$. On reference to Fig. 9 it will be seen that the rear or lower edge of said shoe is formed with a number of notches $Z^5$, equaling in number and corresponding in position to the tailpieces $v'$ of the dogs V. Now the shoe $T^{50}$ is capable of a limited longitudinal movement on the bar $T^5$, and if the same is moved to bring its notches $Z^5$ in line with the tailpieces $v'$ of the dogs then when the bar is carried backward by the operating devices the tailpieces are not struck by said bar $T^5$ on this return stroke, and therefore the part $V'$ of the latching-dog which holds the plate U in operated position is not forced outward to release said plate, and the latter will remain in operated position to cause a repeat of the same registration when the handle is next operated. It is to be noticed, however, that the operated gear-wheel T is nevertheless returned to normal position even though the shoe $T^{50}$ has been moved to bring the notches $Z^5$ into alinement with the tailpieces $v'$, for upon such lateral shifting of the shoe $T^{50}$ the solid portion adjacent to the notches in the rear edge is now brought into alinement with the gear-wheel T, so that said solid portion will strike the end of the slot $t^2$, formed in said gear-wheel T, and thus force the gear-wheel back to normal position even though the tailpiece $v'$ is not struck to unlatch the operated plate U. The printing mechanism likewise will continue to print the same value or values over again as many times as the handle J is operated. Thus when the stem $Z^{14}$ is turned in the position indicated in Fig. 1 the movable bar is in a position by which the edge portions of the shoe $T^{50}$ between the notches $Z^5$ engage the tailpieces $v'$ of the dog V and both the indicating and printing mechanisms are operated together by the manipulation of the handle J. By turning the stem around to exactly the opposite position, however, the eccentric-pin $Z^{17}$ actuates the yoke $Z^{19}$ to move the hub $Z^{10}$ to the left, and thereby moves the shoe $T^{50}$ longitudinally on the bar $T^5$ so far as to bring the notches $Z^5$ thereof above or in line with the said tailpieces $v'$.

The ordinary operation of this machine is briefly as follows: Keys representing any desired amount within the capacity of the machine are depressed, thus raising corresponding setting-plates and interposing their projections into the path of the motor-bar. The handle is now pulled forward, moving the operating-bar, which as it comes in contact with the projections of the setting-plates revolves the gear-wheels relating to the projected plates until the limit of movement of the bar is reached, which causes revolution of the clutch members of the pocket-wheel mechanism without, however, rotating the pocket-wheels. The same revolution of the above-mentioned gear-wheels causes revolution of the corresponding type-carriers to set them to print numerals corresponding to the operated keys. Meanwhile the first portion of the revolution of any gear-wheel through its lower mechanism sets the blocks corresponding thereto between the striker-bar and the corresponding movable platen, and the setting movement of any of these blocks sets also all the blocks relating to type-carriers for printing numerals of lower denominations in position to actuate platens for printing zeros. During the forward movement of the handle the paper-feeding mechanism, the locking-bar for the type-carriers, and the ribbon-feeding devices are actuated to perform their various functions, and at the end of this forward stroke the striker-bar rises and presses those platens under which blocks have been placed against the paper, the inking-ribbon and the type-carriers corresponding to those platens, thus printing an amount upon the record-strip represented by the operated keys. During the forward stroke of the handle the carrying devices are operated in part in any column where tally-pieces equal to or exceeding the maximum capacity of said column have accumulated upon the stop or shelf, for in this case the plugs pinch a tally-piece and the shelf is withdrawn, dropping the tally-pieces underneath the plug into that portion of the guideway under the shelf, and the lever mechanism is operated to turn the pocket-wheel of the next higher denominational guideway sufficient to lower the indicating-column to the extent of one tally-piece and adding one tally-piece to the accumulating column. During the return movement of the handle the operated setting-plates are returned to their initial positions by being retracted from their projected positions and by being rotated with their supporting gear-wheels. This backward rotation of the gear-wheels revolves the pocket-wheels through their clutch members, which moves the series of tally-pieces to a degree and in denominations corresponding to the operated keys and setting-plates, thus diminishing or lowering the indicating-columns corresponding to those pocket-wheels and adding to the accumulating columns of the same denominations. The return movement of the handle also restores to their initial positions in the register the operated keys, the carrying devices, and the shelf or stop, and in the printing devices the blocks, the type-carriers, the locking-bar, and the striker, beside moving the paper-feed mechanism and the ribbon-feed mechanism into position for new operations.

It is of course to be understood that the tally pieces or balls may be considered either as an indicating mechanism or a registering mechanism, and therefore where in the claims I use the term "indicating mechanism" I wish to use said term in its broader sense, as above mentioned.

I have thus produced an organized machine containing the following novel mechanisms or devices and combinations thereof, to wit: (a) an indicating mechanism as to any denomination, (b) a restoring or resetting mechanism for the indicating mechanism of any denomination which is easily and quickly operated and does not require the movement of any of the other parts of the machine, (c) a totalizing indicating or registering mechanism, (d) a means for setting said indicating mechanism correspondingly to key mechanism, (e) a means for disconnecting the registering or indicating mechanism from the operating mechanism, (f) a carrying mechanism for the different denominational indicating or registering mechanisms, (g) a means for repeating the same counting operation of the indicating or registering mechanism without resetting the key mechanism, (h) a printing mechanism, (i) a means for excluding the printing of zeros to the left of the highest numeral which it is desired to print, (j) a means for stopping the operation of the printer by the operating mechanism, (k) a means for repeating the same printing operation with or without corresponding repeating operations of the registering mechanism, (l) a means for disconnecting the indicating mechanism to permit the independent operation of the printing mechanism, (m) a feeding mechanism for the inking-ribbon.

It will be noted that my invention is not to be limited to the devices herein set forth, but, as indicated in my claims, as well as in the foregoing description, that many other constructions may embody my invention either in details or otherwise and that my claims are not to be restricted to any greater extent than the state of the art and a liberal construction of their import may require.

What I claim is—

1. In a calculating-machine, an indicating-column of movable tally-pieces operated to indicate an amount by diminution of the column, in combination with key mechanism representing different unit values, and means coöperating with the key mechanism for producing differential diminutions of the column corresponding to the respective values.

2. In a calculating-machine, an indicating-column of movable tally-pieces operated to indicate an amount by diminution of the column, in combination with key mechanism representing different unit values, means coöperating with the key mechanism for producing diminutions of the column corresponding to the respective key values, and means for causing the column to indicate zero at will.

3. In a calculating-machine, an indicating-column of movable tally-pieces operated to indicate in a column, by consecutive diminutions thereof, the sum-total of two or more added amounts, in combination with key mechanism for controlling the diminutions of the column according to the respective key values, and devices for automatically causing the column to indicate zero whenever the maximum registering capacity of the column has been reached or exceeded.

4. In a calculating-machine, an indicating-column of movable tally-pieces operated to indicate by the column, by consecutive diminutions thereof the sum-total of two or more added amounts, in combination with key mechanism representing different unit values, means coöperating with the key mechanism for producing diminutions of the column corresponding to the respective key values, means for resetting the column to indicate zero at will, and devices for automatically causing the column to indicate zero whenever the maximum registering capacity of the column has been reached or exceeded.

5. In a calculating-machine, an indicating-column of movable tally-pieces operated to indicate an amount by diminution of the column, in combination with a key-operated setting mechanism representing different unit values, and an operating mechanism for moving the tally-pieces correspondingly to the different key values of the setting mechanism.

6. In a calculating-machine, an indicating-column of movable tally-pieces operated to indicate an amount by diminution of the column, in combination with a setting mechanism for determining the diminution of said column and an operating mechanism for moving the tally-pieces according to the positions of the setting mechanism.

7. In a calculating-machine, an indicating-column of movable tally-pieces operated to indicate an amount by diminution of the column in combination with a setting mechanism for determining the diminution of said column, an operating mechanism for moving the tally-pieces according to the position of the setting mechanism, and devices for automatically causing the column to indicate zero.

8. In a calculating-machine, the combination with an endless guideway of a series of tally-pieces mounted in the same, the continuity of which series is broken only at one point in said endless guideway, and means for moving the entire column of tally-pieces differentially so as to cause one of the end tally-pieces to indicate the amount according to its position.

9. In a calculating-machine, an endless guideway, a series of tally-pieces movable in said guideway and comprising a column the upper tally-piece of which indicates the amount, and means for moving the column from below to bring its uppermost tally-piece into different indicating positions.

10. In a calculating-machine, an endless guideway, a series of tally-pieces movable in said guideway and comprising a column, the upper tally-piece of which indicates the amount, means for moving the column from below to bring its uppermost tally-piece into different indicating positions and means for restoring the column to its normal zero-indicating position.

11. In a calculating-machine, an endless guideway, a series of tally-pieces movable in said guideway, and comprising a column of said tally-pieces operated as a column to indicate by consecutive movements thereof, the sum-total of two or more added amounts, in combination with key mechanism representing different unit values, and means coöperating with the key mechanism, for producing different movements of the column corresponding to the respective key values, and devices for restoring the column to its maximum height by conveying tally-pieces thereto from said series whenever the maximum registering capacity of the column has been reached or exceeded.

12. In a calculating-machine, an endless guideway, a series of tally-pieces movable in said guideway and comprising a column of said tally-pieces operated to indicate an amount by diminution of the column, in combination with key mechanism representing different unit values, means coöperating with the key mechanism for producing different diminutions of the column corresponding to the respective key values, and devices for restoring the column to its maximum height by conveying tally-pieces thereto from said series.

13. In a calculating-machine, an endless guideway, a series of tally-pieces movable in said guideway, and comprising a column of said tally-pieces operated to indicate by the column, by consecutive diminutions thereof, the sum-total of two or more added amounts, in combination with key mechanism representing different unit values, and means coöperating with the key mechanism for producing different diminutions of the column corresponding to the respective key values, and automatic devices for restoring the column to its maximum height by conveying tally-pieces thereto from said series whenever the maximum registering capacity of the column has been reached or exceeded.

14. In a calculating-machine, an endless guideway, a series of tally-pieces movable in said guideway, and comprising a column of said tally-pieces operated to indicate by the column, by consecutive diminutions thereof, the sum-total of two or more added amounts, in combination with a setting mechanism for determining different diminutions of said column and comprising a key mechanism representing different unit values, and an operating mechanism for moving the tally-pieces correspondingly to the respective key values of the setting mechanism, and devices actuated by said operating mechanism for restoring the column to its maximum height by conveying tally-pieces thereto from said series.

15. In a calculating-machine, a series of indicating-columns of movable tally-pieces, each column representing a different denomination, and operated to indicate an amount by diminution of the column, in combination with key mechanism representing different unit values for each column, means coöperating with the key mechanisms for producing diminutions of the respective columns corresponding to the respective key values, and carrying mechanism for diminishing any of the higher columns by one tally-piece whenever the maximum registering capacity in the next lower denominational column has been reached or exceeded.

16. In a calculating-machine, a series of columns of movable tally-pieces, each column representing a different denomination and operated to indicate an amount by movement of the entire column, in combination with key mechanism representing different unit values for each column, means coöperating with the key mechanism for producing movements of the respective columns corresponding to the respective key values, mechanism for causing each column to indicate zero whenever the maximum registering capacity indicated by the column has been reached or exceeded, and coöperating carrying mechanism for moving any of the higher columns a distance equal to one tally-piece whenever the maximum registering capacity in the next lower denominational column has been reached or exceeded.

17. In a calculating-machine, a series of indicating-columns of movable tally-pieces, each column representing different denominations and operated to indicate an amount by diminution of the column, in combination with key mechanism representing different unit values for each column, means coöperating with the key mechanism for producing diminutions of the respective columns corresponding to the respective key values, mechanism for causing each column to indicate zero whenever the maximum registering capacity of the column has been reached or exceeded, and coöperating carrying mechanism for diminishing any of the higher columns by one tally-piece whenever the maximum registering capacity of the next lower denominational column has been reached or exceeded.

18. In a calculating-machine, a series of endless guideways, a series of tally-pieces in each guideway, each series representing a different denomination, and comprising in each series of tally-pieces an indicating-column thereof, operated to indicate an amount by diminution of the column, in combination with key mechanism representing different unit values for each series of tally-pieces, means coöperating with the key mechanisms for producing diminutions of the respective columns corresponding to the respective key values, and carrying mechanism for diminishing any of the higher columns by one tally-piece whenever the maximum indicating capacity of the next lower column has been reached or exceeded.

19. In a calculating-machine, a series of endless guideways, a series of tally-pieces in each guideway representing different denominations and comprising in each series of tally-pieces an indicating-column thereof, operated to indicate an amount by diminution of the column, in combination with key mechanism representing different unit values for each series of tally-pieces, means coöperating with the key mechanisms for producing diminutions of the respective columns corresponding to the respective key values, mechanism for causing each column to indicate zero by conveying tally-pieces thereto from the same series, whenever the maximum indicating capacity of such column has been reached or exceeded, and coöperating carrying mechanism for diminishing any of the higher columns by one tally-piece whenever the maximum indicating capacity in the next lower column has been reached or exceeded.

20. In a calculating-machine, a series of movable indicating-columns of tally-pieces, each column representing a different denomination and operated to indicate an amount by diminution of the column, in combination with a setting mechanism for determining different diminutions of each column, and comprising a key mechanism representing different unit values for each column, a rotary device and mechanism for causing the column to indicate zero whenever the maximum indicating capacity of the column has been reached or exceeded, carrying mechanism for diminishing any of the higher columns by one tally-piece whenever the maximum indicating capacity in the next lower column has been reached or exceeded, and an operating mechanism for operating said rotary device for diminishing the columns correspondingly to the respective key values of the setting mechanisms and for operating the carrying mechanisms and the column-restoring mechanisms.

21. In a calculating-machine, a series of endless guideways, a series of tally-pieces in each guideway, representing different denominations and comprising in each series an indicating-column of said tally-pieces operated to indicate an amount by diminution of the column, in combination with a setting mechanism for determining different diminutions of each column, and comprising a key mechanism representing different unit values for each column, mechanism for causing each column to indicate zero by conveying the tally-pieces thereto from the same series whenever the maximum indicating capacity of such column has been reached or exceeded, carrying mechanism for diminishing any of the higher columns by one tally-piece whenever the maximum indicating capacity in the next lower column has been reached or exceeded, an operating mechanism for diminishing the columns correspondingly to the respective key values of the setting mechanisms and for operating the carrying mechanisms and the column-restoring mechanisms.

22. In a calculating-machine, a permanent endless guideway; a series of tally-pieces movable in said guideway; means for separating in said series a movable indicating-column of tally-pieces adapted to indicate an amount, and an accumulating column composed of tally-pieces complementary in number to the number of tally-pieces which indicate the amount in the indicating-column; in combination with key mechanism representing different unit values; and means coöperating with the key mechanism for operating the series of tally-pieces for moving the indicating-column and for adding tally-pieces to the accumulating column correspondingly to the respective key values.

23. In a calculating-machine, an endless guideway; a series of tally-pieces movable in said guideway; means for separating in said series a movable indicating-column of tally-pieces adapted to indicate an amount, and an accumulating column composed of tally-pieces complementary in number to the number of tally-pieces which indicate the amount in the indicating-column; in combination with key mechanism representing different unit values; means coöperating with the key mechanism for operating the series of tally-pieces for moving the indicating-column and for adding tally-pieces to the accumulating column correspondingly to the respective key values, and means operated at will for conveying a number of tally-pieces from the accumulating column to the indicating-column for causing the latter to indicate zero.

24. In a calculating-machine, an endless guideway; a series of tally-pieces movable in said guideway; means for separating in said series a movable indicating-column of tally-pieces adapted to indicate an amount, and an accumulating column composed of tally-pieces complementary in number to the number of tally-pieces which indicate the amount in the indicating-column; in combination with key mechanism representing different unit values, means coöperating with the key mechanism for operating the series of tally-pieces for moving the indicating-column and for adding tally-pieces to the accumulating column correspondingly to the respective key values, and automatically-operated means for conveying tally-pieces from the accumulating column to the indicating-column for causing the latter to indicate zero whenever the maximum indicating capacity of the indicating-column has been reached or exceeded.

25. In a calculating-machine, an endless guideway; a series of tally-pieces movable in said guideway; means for separating in said series an indicating-column adapted to indicate by consecutive diminutions of said column the sum-total of two or more added amounts, and an accumulating column set above the indicating-column and composed of tally-pieces equal in number to the number of tally-pieces by which the first column is diminished; in combination with key mechanism representing different unit values; and means coöperating with the key mechanism for producing diminutions of the indicating-column and additions to the accumulating column corresponding to the respective key values.

26. In a calculating-machine, an endless guideway; a series of tally-pieces movable in said guideway; means for separating in said series an indicating-column adapted to indicate by consecutive diminutions of said column the sum-total of two or more added amounts, and an accumulating column set above the indicating-column and composed of tally-pieces equal in number to the number of tally-pieces by which the first column is diminished; in combination with key mechanism representing different unit values; means coöperating with the key mechanism for producing diminutions of the indicating-column and additions to the accumulating column corresponding to the respective key values, and means operated at will for conveying a number of tally-pieces from the accumulating column to the indicating-column for causing the latter to indicate zero.

27. In a calculating-machine, an endless guideway, a series of tally-pieces, movable in said guideway; means for separating in said series an indicating-column adapted to indicate by consecutive diminutions of said column the sum-total of two or more added amounts, and an accumulating column set above the indicating-column, and composed of tally-pieces equal in number to the number of tally-pieces by which the first column is diminished; in combination with key mechanism for producing diminutions of the indicating-column and additions to the accumulating column corresponding to the respective key values, and automatically-operated means for conveying tally-pieces from the accumulating column to the indicating-column for causing the latter to indicate zero whenever the maximum registering capacity indicated by the indicating-column has been reached or exceeded.

28. In a calculating-machine, two endless guideways; a series of movable tally-pieces in each guideway, means for separating in each series a movable indicating-column of tally-pieces adapted to indicate an amount, and an accumulating column composed of tally-pieces complementary in number to the number of tally-pieces which indicate the amount in the indicating-column; in combination with a setting mechanism for determining the operation of the indicating-column and for determining the complementary number of tally-pieces to be added to the accumulating column and comprising a key mechanism representing different unit values, and a single operating mechanism for moving the tally-pieces in each guideway correspondingly to the respective key values.

29. In a calculating-machine, two endless guideways; a series of movable tally-pieces in each guideway, means for separating in each series a movable indicating-column of tally-pieces adapted to indicate an amount, and an accumulating column composed of tally-pieces complementary in number to the number of tally-pieces which indicate the amount in the indicating-column; in combination with a setting mechanism for determining the operation of the indicating-column and for determining the complementary number of tally-pieces to be added to the accumulating column and comprising a key mechanism representing different unit values, means for conveying tally-pieces in each series from the accumulating column to the indicating-column for causing the latter to indicate zero whenever the maximum indicating capacity of the indicating-column has been reached or exceeded, and a single operating mechanism for moving the tally-pieces in each guideway correspondingly to the respective key values, and for actuating said column-restoring means.

30. In a calculating-machine, two endless guideways; a series of movable tally-pieces in each guideway; means for separating in each series a movable indicating-column of tally-pieces adapted to indicate an amount, and an accumulating column composed of tally-pieces complementary in number to the number of tally-pieces which indicate the amount in the indicating-column; in combination with a setting mechanism for determining the operation of the indicating-column and for determining the complementary number of tally-pieces to be added to the accumulating column and comprising a key mechanism representing different unit values, carrying mechanism for operating the higher column a distance equal to the thickness of one tally-piece whenever the maximum indicating capacity in the lower column has been reached or exceeded, causing means for conveying tally-pieces in each series from the accumulating column to the indicating-column for causing the latter to indicate zero whenever the maximum indicating capacity of the indicating-column has been reached or exceeded, and a single operating mechanism for moving the tally-pieces in each guideway correspondingly to the respective key values, and for actuating said column-restoring means and said carrying mechanism.

31. In a calculating-machine, two endless guideways; a series of movable tally-pieces in each guideway, each series representing a denomination, means for separating in each series a movable indicating-column of tally-pieces adapted to indicate an amount, by diminution of the column, and an accumulating column composed of tally-pieces complementary in number to the number of tally-pieces which indicate the amount in the indicating-column; in combination with a setting mechanism for determining the diminution of the indicating-column, and for determining the complementary number of tally-pieces to be added to the accumulating column, and comprising a key mechanism representing different unit values, resetting means for conveying tally-pieces in each series from the accumulating column to the indicating-column for causing the latter to indicate zero whenever the denominational maximum indicated by the indicating-column has been reached or exceeded, and a single operating mechanism for moving the tally-pieces in each guideway correspondingly to the respective key values, and for actuating said column-restoring means.

32. In a calculating-machine, an endless guideway, a series of tally-pieces movable in said guideway and comprising a column of said tally-pieces operated to indicate an amount by movement of the column, in combination with key mechanism representing different key values, means coöperating with said key mechanism and comprising a rotary device engaging the tally-pieces in said series for producing different movements of the column in one direction corresponding to the respective key values, and devices for restoring the column to its maximum height by conveying pieces thereto from said series.

33. In a calculating-machine, an endless guideway, a series of tally-pieces movable in said guideway and comprising a column of said tally-pieces operated to indicate an amount by diminution of the column, in combination with key mechanism representing different unit values, means coöperating with the key mechanism and comprising a rotary device engaging the tally-pieces in said series, for producing different diminutions of the column corresponding to the respective key values, and devices for restoring the column to its maximum height by conveying tally-pieces thereto from said series.

34. In a calculating-machine, an endless guideway, a series of tally-pieces movable in said guideway, and comprising a column of said tally-pieces operated to indicate by the column, by consecutive diminutions thereof, the sum-total of two or more added amounts, in combination with key mechanism representing different unit values, and means coöperating with the key mechanism and comprising a rotary device engaging the tally-pieces in said series for producing different diminutions of the column corresponding to the respective key values, and automatic devices for restoring the column to its maximum height by conveying tally-pieces thereto from said series whenever the maximum capacity indicated by the column has been reached or exceeded.

35. In a calculating-machine, an endless guideway, a series of tally-pieces movable in said guideway and comprising a column of said tally-pieces operated to indicate an amount by movement of the column, in combination with a setting mechanism for determining different movements of said column, and comprising a key mechanism representing different unit values and a rotary device engaging the tally-pieces in said series, and an operating mechanism for moving the column by said rotary device correspondingly to the respective key values of the setting mechanism.

36. In a calculating-machine, an endless guideway, a series of tally-pieces movable in said guideway, and comprising a column of said tally-pieces operated to indicate an amount by movement of the column, in combination with a setting mechanism for determining different movements of said column and comprising a key mechanism representing different unit values, and a rotary device engaging the tally-pieces in said series, an operating mechanism for moving the column by said rotary device correspondingly to the respective key values of the setting mechanism, and means actuated by the operating mechanism for causing the column to indicate zero.

37. In a calculating-machine, an endless guideway, a series of tally-pieces movable in said guideway, and comprising a column of said tally-pieces operated to indicate by the column, by consecutive diminutions thereof, the sum-total of two or more added amounts, in combination with a setting mechanism for determining different diminutions of said column and comprising a key mechanism representing different unit values, and a rotary device engaging the tally-pieces in said series, and an operating mechanism for moving the tally-pieces by said rotary device correspondingly to the respective key values of the setting mechanism, and devices actuated by said operating mechanism for restoring the column to its maximum height by conveying tally-pieces thereto from said series.

38. In a calculating-machine, an endless guideway, a series of tally-pieces, movable in said guideway, and comprising a column of said tally-pieces operated to indicate by the column, by consecutive diminutions thereof, the sum-total of two or more added amounts, in combination with a setting mechanism for determining different diminutions of said column and comprising a key mechanism representing different unit values, and a rotary device engaging the tally-pieces in said series, an operating mechanism for moving the tally-pieces by said rotary device correspondingly to the respective key values of the setting mechanism, and devices actuated by said operating mechanism for automatically restoring the column to its maximum height by conveying tally-pieces thereto from said series whenever the maximum capacity of the column has been reached or exceeded.

39. In a calculating-machine, a series of indicating-columns of movable tally-pieces, each column representing a different denomination, and operated to indicate an amount by movement of the column, in combination with key mechanism representing different unit values for each column, means coöperating with the key mechanisms and comprising a rotary pocket-wheel engaging the tally-pieces in said series for producing movements of the respective columns corresponding to the respective key values, and carrying mechanism for moving the pocket-wheels of any of the higher columns a distance equal to one tally-piece whenever the maximum capacity in the next lower denominational column has been reached or exceeded.

40. In a calculating-machine, a series of indicating-columns of movable tally-pieces, each column representing a different denomination, and operated to indicate an amount by movement of the column, in combination with a setting mechanism for determining different movements of each column, and comprising a key mechanism representing different unit values for each column, and a rotary device engaging the tally-pieces in said series, carrying mechanism for moving the rotary device of any of the higher columns a distance equal to one tally-piece, whenever the denominational maximum in the next lower column has been reached or exceeded, and an operating mechanism for operating said rotary device for moving the column correspondingly to the respective key values of the setting mechanisms and for operating the carrying mechanism.

41. In a calculating-machine, a series of indicating-columns of movable tally-pieces, each column representing a different denomination and operated to indicate an amount by diminution of the column in combination with a setting mechanism for determining different diminutions of each column and comprising a key mechanism representing different unit values for each column and a rotary device engaging the tally-pieces in each series, mechanisms for causing the column to indicate zero whenever the maximum capacity of the column has been reached or exceeded, carrying mechanism for diminishing any of the higher columns by one tally-piece whenever the maximum capacity of the next lower column has been reached or exceeded, and an operating mechanism for operating said rotary device for diminishing the columns correspondingly to the respective key values of the setting mechanisms and for operating the carrying mechanisms and the column-restoring mechanisms.

42. In a calculating-machine, an endless guideway, a series of tally-pieces movable in said guideway and comprising a column of said tally-pieces operated to indicate an amount by movement of the column, in combination with key mechanism representing different key values, means coöperating with said key mechanism and comprising a rotary clutch device having one member revoluble in two directions and a member revoluble in one direction only and engaging the tally-pieces in said series for producing different movements of the column in one direction corresponding to the respective key values, and devices for restoring the column to its maximum height by conveying pieces thereto from said series.

43. In a calculating-machine, an endless guideway, a series of tally-pieces movable in said guideway and comprising a column of said tally-pieces operated to indicate an amount by diminution of the column, in combination with key mechanism representing different unit values, means coöperating with the key mechanism and comprising a rotary clutch device having one member revoluble in two directions and a member revoluble in one direction only and engaging the tally-pieces in said series, for producing different diminutions of the column corresponding to the respective key values, and devices for restoring the column to its maximum height by conveying tally-pieces thereto from said series.

44. In a calculating-machine, an endless guideway, a series of tally-pieces, movable in said guideway and comprising a column of said tally-pieces operated to indicate by the column, by consecutive diminutions thereof, the sum-total of two or more added amounts, in combination with key mechanism representing different unit values, and means coöperating with the key mechanism and comprising a rotary clutch device having one member revoluble in two directions and a member revoluble in one direction only and engaging the tally-pieces in said series, for producing different diminutions of the column corresponding to the respective key values, and automatic devices for restoring the column to its maximum height by conveying tally-pieces thereto from said series whenever the maximum capacity of the column has been reached or exceeded.

45. In a calculating-machine, an endless guideway, a series of tally-pieces movable in said guideway and comprising a column of said tally-pieces operated to indicate an amount by movement of the column, in combination with key mechanism representing different key values, means coöperating with said key mechanism and comprising a rotary clutch device having one member revoluble in two directions and a member revoluble in one direction only and engaging the tally-pieces in said series for producing different movements of the column in one direction corresponding to the respective key values, devices for restoring the column to its maximum height by conveying tally-pieces thereto from said series, and an operating mechanism having a uniform to-and-fro movement for actuating said clutch device and said restoring devices.

46. In a calculating-machine, an endless guideway, a series of tally-pieces, movable in said guideway and comprising a column of said tally-pieces operated to indicate an amount by movement of the column, in combination with key mechanism representing different key values, means coöperating with said key mechanism and comprising a rotary clutch device having a driving member revoluble in two directions and a pocket-wheel revoluble in one direction only and constituting the driven clutch member, said pocket-wheel engaging the tally-pieces in said series, for producing different movements of the column in one direction corresponding to the respective key values, and devices for restoring the column to its maximum height by conveying pieces thereto from said series.

47. In a calculating-machine, an endless guideway, a series of tally-pieces, movable in said guideway and comprising a column of said tally-pieces operated to indicate an amount by diminution of the column, in combination with key mechanism representing different unit values, means coöperating with the key mechanism and comprising a rotary clutch device having a driving member revoluble in two directions and a pocket-wheel revoluble in one direction only and constituting the driven clutch member, said pocket-wheel engaging the tally-pieces in said series, for producing different diminutions of the column corresponding to the respective key values, and devices for restoring the column to its maximum height by conveying tally-pieces thereto from said series.

48. In a calculating-machine, an endless guideway, a series of tally-pieces movable in said guideway and comprising a column of said tally-pieces operated to indicate by the column, by consecutive lowerings thereof, the sum-total of two or more added amounts, in combination with key mechanism representing different unit values, means coöperating with the key mechanism and comprising a rotary clutch device having a driving member revoluble in two directions and a pocket-wheel revoluble in one direction only and constituting the driven clutch member, said pocket device engaging the tally-pieces in said series for producing lowerings of the column corresponding to the respective key values, and automatic devices for restoring the column to its maximum height by conveying tally-pieces thereto from said series whenever the maximum capacity indicated by the column has been reached or exceeded.

49. In a calculating-machine, an endless guideway, a series of tally-pieces movable in said guideway and comprising a column of said tally-pieces operated to indicate an amount by movement of the column, in combination with a setting mechanism for determining different movements of said column for comprising a key mechanism representing different unit values and a rotary clutch device having a driving member revoluble in two directions and a pocket-wheel revoluble in one direction only and constituing the driven clutch member, said pocket-wheel engaging the tally-pieces in said series and an operating mechanism for moving the column by said rotary device correspondingly to the respective key values of the setting mechanism.

50. In a calculating-machine, an endless guideway, a series of tally-pieces movable in said guideway, and comprising a column of said tally-pieces operated to indicate an amount by movement of the column, in combination with a setting mechanism for determining different movements of said column and comprising a key mechanism representing different unit values, and a rotary clutch device having a driving member revoluble in two directions and a pocket-wheel revoluble in one direction only and constituting the driven clutch member, said pocket-wheel engaging the tally-pieces in said series, an operating mechanism for moving the column by said rotary device correspondingly to the respective key values of the setting mechanism, and means actuated by the operating mechanism for causing the column to indicate zero.

51. In a calculating-machine, a series of indicating-columns of movable tally-pieces each column representing a different denomination, and operated to indicate an amount by movement of the column, in combination with key mechanism representing different unit values for each column, means coöperating with the key mechanisms and comprising a rotary clutch device having a driving member revoluble in two directions and a pocket-wheel revoluble in one direction only and constituting the driven clutch member, said pocket-wheel engaging the tally-pieces in said series for producing movements of the respective columns corresponding to the respective key values, and carrying mechanism for moving the pocket-wheels of any of the higher columns a distance equal to one tally-piece whenever the maximum capacity of the next lower denominational column has been reached or exceeded.

52. In a calculating-machine, a series of indicating-columns of movable tally-pieces each column representing a different denomination operated to indicate by consecutive movements thereof the sum-total of two or more added amounts, in combination with key mechanism representing different unit values for each column, means coöperating with the key mechanism and comprising a rotary clutch device having a driving member revoluble in two directions and a pocket-wheel revoluble in one direction only and constituting the driven clutch member, said pocket-wheel engaging the tally-pieces in said series for producing movements of the respective columns corresponding to the respective key values, mechanism for causing each column to indicate zero whenever the maximum capacity indicated by the column has been reached or exceeded, and coöperating carrying mechanism for moving the pocket-wheels of any of the higher columns a distance equal to the thickness of one tally-piece whenever the maximum capacity in the next lower column has been reached or exceeded.

53. In a calculating-machine, a series of indicating-columns of movable tally-pieces each column representing a different denomination and operated to indicate an amount by movement of the column, in combination with a setting mechanism for determining different movements of each column, and comprising a key mechanism representing different unit values for each column and a rotary clutch device having a driving member revoluble in two directions and a pocket-wheel revoluble in one direction only and constituting the driven clutch member, said pocket-wheel engaging the tally-pieces in said series, carrying mechanism for moving the pocket-wheels of any of the higher columns a distance equal to the thickness of one tally-piece, whenever the maximum capacity of the next lower column has been reached or exceeded, and an operating mechanism for operating said rotary device for moving the column correspondingly to the respective key values of the setting mechanisms and for operating the carrying mechanism.

54. In a calculating-machine, an endless guideway, a series of movable tally-pieces in said guideway and comprising a movable indicating-column of said tally-pieces, key mechanism for each series, a movable positive stop in the path of each series of tally-pieces and adapted to sustain an accumulating column of said tally-pieces above the indicating-column, a plug movable to and from the accumulating column to engage a tally-piece thereof whenever the maximum capacity has been reached or exceeded in said indicating-column, and means coöperating with the key mechanism for moving the indicating-column of tally-pieces to indicate values corresponding to its key mechanism and for withdrawing said stop whenever the plug engages a tally-piece whereby tally-pieces in the accumulating column are conveyed to the indicating-column.

55. In a calculating-machine, an endless guideway, a series of movable tally-pieces in said guideway and comprising a movable indicating-column of said tally-pieces, a movable stop in the path of each series of tally-pieces and adapted to sustain an accumulating column of said tally-pieces above the indicating-column, a plug movable to and from the accumulating column to engage a tally-piece thereof whenever the maximum capacity has been reached or exceeded in said indicating-column, a setting mechanism for determining different movements of said indicating-column and comprising a key mechanism representing different unit values, and an operating mechanism for moving the series of tally-pieces correspondingly to the respective key values of the setting mechanism for withdrawing said stop whenever the plug engages a tally-piece whereby tally-pieces in the accumulating column are conveyed to the indicating-column.

56. In a calculating-machine, an endless guideway, a series of movable tally-pieces in said guideway, and comprising in each series an indicating-column of said tally-pieces, key mechanism for each series, a movable stop in the path of each series of tally-pieces and adapted to sustain an accumulating column of said tally-pieces above the indicating-column, a plug movable to and from the accumulating column to engage a tally-piece resting against said stop whenever the maximum capacity has been reached or exceeded in said indicating-column, a lever for each series working on a fulcrum to move the plug of said series and having an independent fulcrum which becomes the working fulcrum of the lever to move the stop when the plug engages a tally-piece in said accumulating column, connections with the lever for operating the series of tally-pieces representing a higher denomination to indicate an added unit therein whenever the independent fulcrum of the lever becomes the working fulcrum thereof, and means for coöperating with the key mechanism for operating each series of tally-pieces to indicate values in its indicating-column corresponding to its key mechanism and for operating said lever and said connections.

57. In a calculating-machine, an endless guideway, a series of movable tally-pieces in said guideway and comprising an indicating-column of said tally-pieces, a movable stop in the path of each series of tally-pieces and adapted to sustain an accumulating column of said tally-pieces above the indicating-column, a plug movable to and from the accumulating column to engage a tally-piece resting against said stop whenever the maximum capacity has been reached or exceeded in said indicating-column, a lever for each series working on a fulcrum to move the plug of said series and having an independent fulcrum which becomes the working fulcrum of the lever to move the stop when the plug engages a tally-piece in said accumulating column, and connections with the lever for operating the series of tally-pieces representing the higher denomination to indicate an added unit therein whenever the independent fulcrum of the lever becomes the working fulcrum thereof, a setting mechanism for determining different amounts of said series of tally-pieces and comprising a key mechanism representing different unit values, and an operating mechanism for moving the series of tally-pieces correspondingly to the respective key values of the setting mechanism and for operating the lever and said connections.

58. In a calculating-machine, two endless guideways, a series of movable tally-pieces in each guideway and comprising in each series an indicating-column of said tally-pieces, key mechanism for each series, a movable stop in the path of each series of tally-pieces and adapted to sustain an accumulating column of said tally-pieces, above the indicating-column, a plug movable to and from the accumulating column to engage a tally-piece resting against said stop whenever the maximum capacity has been reached or exceeded in said indicating-column, a lever for each series working on a fulcrum to move the plug of said series and having an independent fulcrum which becomes the working fulcrum of the lever to move the stop when the plug engages a tally-piece in said accumulating column, connections with said lever for moving said stop whenever the plug engages a tally-piece in the accumulating column whereby the stop is withdrawn and the tally-pieces sustained by said stop may be conveyed to the indicating-column, connections with said lever for operating the series of tally-pieces representing the higher denomination to indicate an added unit in the indicating-column whenever the independent fulcrum of the lever becomes the working fulcrum thereof, and means coöperating with the key mechanism for moving each indicating-column to indicate values corresponding to its key mechanism and for operating each lever and said connections.

59. In a calculating-machine, two endless guideways, a series of movable tally-pieces in each guideway and comprising in each series an indicating-column of said tally-pieces, a movable stop in the path of each series of tally-pieces and adapted to sustain an accumulating column of said tally-pieces above the indicating-column, a plug movable to and from the accumulating column to engage tally-pieces resting against said stop whenever the maximum capacity has been reached or exceeded in said indicating-column, a lever for each series working on a fulcrum to move the plug of said series and having an independent fulcrum which becomes the working fulcrum of the lever to move the stop when the plug engages a tally-piece in said accumulating column, connections with said lever for moving said stop whenever the plug engages a tally-piece in the accumulating column whereby the stop is withdrawn and the tally-pieces sustained by said stop may be conveyed to the indicating-column, connections with said lever for operating the series of tally-pieces representing the higher denomination to indicate an added unit in the indicating-column thereof, whenever the independent fulcrum thereof becomes the working fulcrum thereof, a setting mechanism for each series of tally-pieces for determining different movements thereof and comprising key mechanism representing different unit values, and an operating mechanism for moving each series of tally-pieces correspondingly to the respective key values of its setting mechanism and for operating each lever and said connections.

60. In a calculating-machine, an indicating mechanism, a key mechanism, and an oscillatory operating mechanism having a uniform to-and-fro movement, in combination with a setting mechanism comprising a series of pivoted elements mounted on the same pivot with the oscillatory operating mechanism and corresponding to different key values and each adapted to be projected by the key mechanism into a different position in the path of the operating mechanism from that of any other element, so that each will be oscillated a different distance on its fulcrum by said operating mechanism; intermediate devices movable by said elements for actuating the indicating mechanism correspondingly to the operated element, means for removing each projected element from the path of the operating mechanism, and means for restoring the series of elements to its initial position.

61. In a calculating-machine, an indicating mechanism, a series of keys, and an oscillatory operating mechanism having a uniform to-and-fro movement, in combination with a setting mechanism comprising a series of pivoted elements mounted on the same pivot with the oscillatory operating mechanism and corresponding to the respective key values and each adapted to be projected upon operation of a key into a different position in the path of the operating mechanism from that of any other element, so that each will be moved a different distance on its fulcrum by said operating mechanism; intermediate devices movable by said elements for actuating the indicating mechanism correspondingly to the operated elements, means for removing each projected element from the path of the operating mechanism, and means for restoring the series of elements to its initial position.

62. In a calculating-machine, an indicating mechanism, a key mechanism, and an oscillatory operating mechanism having a uniform to-and-fro movement, in combination with a setting mechanism comprising a series of pivoted elements mounted on the same pivot with the oscillatory operating mechanism and corresponding to different key values and each adapted respectively to be projected by the key mechanism into a different position in the path of the operating mechanism from that of any other element, so that each will be moved a different distance on its fulcrum by said operating mechanism; intermediate devices between the operating mechanism, and the indicating mechanisms including a clutch device having a driving member movable with said elements in both directions and a driven member movable in one direction only for actuating the indicating mechanism correspondingly to the operated elements, means for removing each projected element from the path of the operating mechanism and means for restoring the series of elements to its initial position.

63. In a calculating-machine, an indicating mechanism, a key mechanism, and an oscillatory operating mechanism having a uniform to-and-fro movement, in combination with a setting mechanism comprising a series of pivoted elements mounted on the same pivot with the oscillatory operating mechanism and corresponding to different key values, and each adapted to be projected by the key mechanism into a different position in the path of the operating mechanism from that of any other element, so that each will be moved a different distance on its fulcrum by said operating mechanism; intermediate devices movable by said elements for actuating the indicating mechanism correspondingly to the operated elements, means for removing each projected element from the path of the operating mechanism, means for restoring the series of elements to its initial position and a printer comprising a movable type-carrier and connecting with said intermediate devices for setting the type-carrier correspondingly to the operated element and for restoring it to its initial position.

64. In a calculating-machine, an indicating mechanism, a series of keys, and an oscillatory operating mechanism having a uniform to-and-fro movement, in combination with a setting mechanism comprising a series of pivoted elements mounted on the same pivot with the oscillatory operating mechanism and corresponding to the respective key values, and each adapted to be projected upon operation of a key into a different position in the path of the operating mechanism, from that of any other element so that each will be moved a different distance on its fulcrum by said operating mechanism, intermediate devices movable with said elements for actuating the indicating mechanism correspondingly to the operated element, means for removing each projected element from the path of the operating mechanism, means for restoring the series of elements to its initial position, and a printer comprising a movable type-carrier, and connections with said intermediate devices for setting the type-carrier correspondingly to the operated element and for restoring it to its initial position.

65. In a calculating-machine, an indicating mechanism, a key mechanism, and an oscillatory operating mechanism having a uniform to-and-fro movement, in combination with a setting mechanism comprising a series of pivoted elements mounted on the same pivot with the oscillatory operating mechanism and corresponding to different key values, and each adapted to be projected by the key mechanism into a different position in the path of the operating mechanism, from that of any other element, so that each will be moved a different distance on its fulcrum by said operating mechanism, intermediate devices between the operating mechanism and the indicating mechanisms including a clutch device having a driving member movable with said elements in both directions and a driven member movable in one direction only, for actuating the indicating mechanism correspondingly to the operated element, means for removing each projected element from the path of the operating mechanism, means for restoring the series of elements to its initial position, and a printer comprising a movable type-carrier, and connections with said intermediate devices for setting the type-carrier correspondingly to the operated element and for restoring it to its initial position.

66. In a calculating-machine, an indicating mechanism, a key mechanism, a printing mechanism, and an oscillatory operating mechanism having a uniform to-and-fro movement, in combination with a setting mechanism comprising a series of pivoted elements mounted on the same pivot with the oscillatory operating mechanism and corresponding to different key values, and each adapted to be projected by the key mechanism into a different position in the path of the operating mechanism, from that of any other element so as to be moved on its fulcrum by said operating mechanism, intermediate devices movable with said elements for actuating the indicating mechanism correspondingly to the operated element, means for removing each projected element from the path of the operating mechanism, means for restoring the series of elements to its initial position, a movable type-carrier, and connections with said intermediate devices for setting the type-carrier correspondingly to the operated element and for restoring it to its initial position, and an impression mechanism actuated by said operating mechanism.

67. In a calculating-machine, an indicating mechanism, a key mechanism, a bar, and devices for imparting to said bar a uniform to-and-fro movement, in combination with a setting mechanism comprising a series of elements corresponding to different key values and each adapted to be projected by the key mechanism into a different position in the path of the bar from that of any other element so as to be moved by said bar, intermediate devices movable by said elements for actuating the indicating mechanism correspondingly to the operated element, means for removing each projected element from the path of the bar, and means for restoring the series of elements to its initial position.

68. In a calculating-machine, an indicating mechanism, a series of keys, a bar, and devices for imparting to said bar a uniform to-and-fro movement, in combination with a setting mechanism comprising a series of elements corresponding to the respective key values and each adapted to be projected upon operation of a key into a different position in the path of the bar from that of any other element so as to be moved by said bar, intermediate devices movable by said elements for actuating the indicating mechanism correspondingly to the operated element, means for removing each projected element from the path of the bar, and means for restoring the series of elements to its initial position.

69. In a calculating-machine, an endless guideway, a series of tally-pieces in said guideway and comprising an indicating-column of said tally-pieces, a key mechanism, and an operating mechanism having a uniform to-and-fro movement, in combination with a setting mechanism comprising a series of elements corresponding to different key values and each adapted respectively to be projected by the key mechanism into a different position in the path of the operating mechanism from that of any other element, a pocket-wheel extending into said guideway, and movable by said elements for actuating the tally-pieces correspondingly to the operated elements, means for removing each projected element from the path of the operating mechanism, and means for restoring the series of elements to its initial position.

70. In a calculating-machine, an endless guideway, a series of tally-pieces, in said guideway and comprising an indicating-column of said tally-pieces, a key mechanism, a bar, and devices for imparting to said bar a uniform to-and-fro movement, in combination with a setting mechanism comprising a series of elements corresponding to different key values and each adapted to be projected by the key mechanism into a different position in the path of the bar from that of any other element, a pocket-wheel extending into said guideway and movable by said elements for actuating the indicating mechanism correspondingly to the operated elements, means for removing each projected element from the path of the bar, and means for restoring the series of elements to its initial position.

71. In a calculating-machine, a series of indicating devices, a key mechanism for each indicating device, a bar, and operating devices for imparting to said bar a uniform to-and-fro movement, in combination with a series of sets of setting mechanism each set comprising a series of elements corresponding to different key values, each element of a series of elements being adapted to be moved by its key mechanism into a different position in the path of the bar from that of any other element of the same series, intermediate devices between the operating devices and the indicating mechanism including a clutch device having a driving member movable with each series of elements in both directions and a driven member movable in one direction only, for actuating its indicating mechanism correspondingly to the operated element, means for removing each operated element from the path of the bar, and means for restoring each series of elements to its initial position.

72. In a calculating-machine, a series of indicating devices, a key mechanism, for each indicating device, a bar, and devices for imparting to said bar a uniform to-and-fro movement, in combination with a series of sets of setting mechanisms each set comprising a series of elements corresponding to different key values, each element of a series of elements being adapted to be projected by its key mechanism into a different position in the path of the bar from that of any other element of the same series, intermediate devices movable by each series of elements for actuating its indicating mechanism correspondingly to the operated elements, means for removing each operated element from the path of the bar, and means for restoring each series of elements to its initial position, and a printer having a series of type-carriers and connections between the respective type-carriers and their corresponding intermediate devices for setting the type-carriers correspondingly to the operated elements and for restoring them to their initial positions.

73. In a calculating-machine, a series of indicating devices, a series of keys for each indicating device, a bar, and devices for imparting to said bar a uniform to-and-fro movement, in combination with a series of sets of setting mechanisms each set comprising a series of elements corresponding to the respective key values, each element of a series of elements being adapted to be projected upon the operation of a key into a different position in the path of the bar from that of any other element of the same series, intermediate devices movable with each series of elements for actuating its indicating mechanism correspondingly to the operated element, means for removing each operated element from the path of the bar, and means for restoring each series of elements to its initial position, and a printer having a series of type-carriers and connections between the respective type-carriers and their corresponding intermediate devices for setting the type-carriers correspondingly to the operated elements and for restoring them to their initial positions.

74. In a calculating-machine, a series of indicating devices, a key mechanism for each indicating device, a bar, and operating devices for imparting to said bar a uniform to-and-fro movement, in combination with a series of sets of setting mechanisms each set comprising a series of elements corresponding to different key values, each element of a series of elements being adapted to be moved by its key mechanism into a different position in the path of the bar from that of any other element of the same series, intermediate devices between the operating devices and each indicating mechanism including a clutch device having a driving member movable with each series of elements in both directions and having a driven member movable in one direction only, for actuating its indicating mechanisms correspondingly to the operated element, means for removing each operated element from the path of the bar, and means for restoring each series of elements to its initial position, and a printer having a series of type-carriers and connections between the respective type-carriers and their corresponding intermediate devices for setting the type-carriers correspondingly to the operated elements and for restoring them to their initial positions.

75. In a calculating-machine, an indicating mechanism, a key mechanism, and an operating mechanism having a uniform to-and-fro movement, in combination with a setting mechanism consisting of a supporting-shaft, a series of plates on said shaft, but non-revoluble as to each other, each having an independent movement transverse to the shaft and each adapted to be projected by the key mechanism into a different position in the path of the operating mechanism from that of any other plate, intermediate devices movable by said plates for actuating the indicating mechanism correspondingly to the operated plate, means for removing each projected plate from the path of the operating mechanism, and means for restoring the series of plates to its initial position.

76. In a calculating-machine, an indicating mechanism, a series of keys, and an operating mechanism having a uniform to-and-fro movement, in combination with a setting mechanism consisting of a supporting-shaft, a series of plates on said shaft, but non-revoluble as to each other, each having an independent movement transverse to the shaft and each adapted to be projected upon operation of a key into a different position in the path of the operating mechanism from that of any other plate, intermediate devices movable by said plates for actuating the indicating mechanism correspondingly to the operated plate in the path of the operating mechanism, and means for restoring the series of plates to its initial position.

77. In a calculating-machine, an indicating mechanism, a key mechanism, and an operating mechanism having a uniform to-and-fro movement, in combination with a setting mechanism consisting of a supporting-shaft, a series of plates on said shaft but non-revoluble as to each other, each having an independent movement transverse to the shaft, and each adapted to be projected by the key mechanism into a different position in the path of the operating mechanism from that of any other plate, intermediate devices between the operating mechanism and the indicating mechanism including a clutch device having a driving member movable with said plates, in both directions, and a driven member movable in one direction only, for actuating the indicating mechanism correspondingly to the operated plate, means for removing each projected plate from the path of the operating mechanism, and means for restoring the series of plates to its initial position.

78. In a calculating-machine, an endless guideway, a series of tally-pieces in said guideway and comprising an indicating-column of said tally-pieces, a key mechanism, and an operating mechanism having a uniform to-and-fro movement, in combination with a setting mechanism consisting of a supporting-shaft, a series of plates on said shaft but non-revoluble as to each other, each having an independent movement transverse to the shaft and each adapted to be projected by the key mechanism into a different position in the path of the operating mechanism from that of any other plate, intermediate devices comprising a pocket-wheel extending into said guideway, a clutch device for operating said pocket-wheel and having a driving member movable with said plates, in both directions, and a driven member movable in one direction only, for actuating the tally-pieces correspondingly to the operated plate, means for removing each projected plate from the path of the operating mechanism, and means for restoring the series of plates to its initial position.

79. In a calculating-machine, a series of indicating mechanisms, a key mechanism for each indicating mechanism, an operating mechanism and a bar having a uniform to-and-fro movement in combination with a series of sets of setting mechanisms, one for each indicating mechanism, said bar being common to them all, each set comprising a series of plates non-revoluble as to each other, each plate being independently movable transversely to the shaft by the key mechanism to be set in a different position in the path of the operating mechanism from that of any other plate of its series, intermediate devices movable by each set of setting mechanisms for actuating the corresponding indicating mechanisms correspondingly to the operated plate, means for removing each projected plate from the path of the bar, and means for restoring each set of setting mechanisms to its initial position.

80. In a calculating-machine, a series of indicating mechanisms, a key mechanism for each indicating mechanism, and a bar having a uniform to-and-fro movement, in combination with a series of sets of setting mechanisms, one for each indicating mechanism, said bar being common to them all, each set comprising a series of plates, non-revoluble as to each other, each plate being independently movable transversely to the shaft by the key mechanism to be set in a different position in the path of the bar from that of any other plate of its series, intermediate devices, between the bar and each indicating mechanism including a clutch device having a driving member movable by each set of setting mechanisms in both directions and a driven member movable in one direction only, for actuating the corresponding indicating mechanisms correspondingly to the operated plate, means for removing each projected plate from the path of the bar, and means for restoring each set of setting mechanisms to its initial position.

81. In a calculating-machine, an endless guideway, a series of tally-pieces movable in said guideway and comprising an indicating-column of said tally-pieces, a key mechanism for each indicating mechanism, and a bar having a uniform to-and-fro movement, in combination with a series of sets of setting mechanisms, one for each indicating mechanism, said bar being common to them all, each set comprising a series of plates, non-revoluble as to each other, each plate being independently movable transversely to the shaft by the key mechanism to be set in a different position in the path of the bar from that of any other plate of its series, intermediate devices comprising a pocket-wheel extending into said guideway, a clutch device for operating said pocket-wheel and having a driving member movable by each set of setting mechanisms in both directions, and a driven member movable in one direction only, for actuating the series of tally-pieces correspondingly to the operated plate, means for removing each projected plate from the path of the bar, and means for restoring each set of setting mechanisms to its initial position.

82. In a calculating-machine, an indicating mechanism, a key mechanism, and an operating mechanism having a uniform to-and-fro movement, in combination with a setting mechanism comprising a movable actuating device for the indicating mechanism, a series of plates carried by said actuating device each one movable by the key mechanism into the path of the operating mechanism in a position different from that of any other plate, a spring device for moving each plate out of the path of the operating mechanism and a latch for retaining any plate in the path of the operating mechanism said latch being adapted to be released by the operating mechanism on its return movement, whereby the movement of the operating mechanism in the one direction actuates the indicating mechanism and the movement of the operating mechanism in the other direction releases any projected plate and restores the series of plates to their initial position.

83. In a calculating-machine, an endless guideway, a series of tally-pieces movable in said guideway and comprising an indicating-column of said tally-pieces, a key mechanism, and an operating mechanism having a uniform to-and-fro movement, in combination with a setting mechanism comprising a movable actuating device for the tally-pieces, a series of plates carried by said actuating device each one movable by the key mechanism into the path of the operating mechanism in a position different from that of any other plate, a spring device for moving each plate out of the path of the operating mechanism and a latch for retaining any plate in the path of the operating mechanism, said latch being adapted to be released by the operating mechanism on its return movement, whereby the movement of the said operating mechanism in one direction actuates the indicating mechanism and its movement in the other direction releases any projecting plate and restores the series of plates to their initial position.

84. In a calculating-machine, an indicating mechanism, a key mechanism, and an operating mechanism having a uniform to-and-fro movement, in combination with a setting mechanism comprising a movable actuating device for the indicating mechanism, a series of plates carried by said actuating device each one movable by the key mechanism into the path of the operating mechanism in a position different from that of any other plate, a spring device for moving each plate out of the path of the operating mechanism, a latch for retaining any plate in the path of the operating mechanism said latch being adapted to be released by said operating mechanism upon its return movement, and a printing mechanism actuated by said operating mechanism whereby the movement of the said operating mechanism in the one direction actuates the indicating and printing mechanisms and its movement in the other direction releases any projected plate and restores the series of plates and the printing mechanism to their initial positions.

85. In a calculating-machine, an indicating mechanism comprising a driven gear-wheel for operating the same, a key mechanism, a bar, and devices for imparting to the bar a uniform to-and-fro oscillation about an axis, in combination with a setting mechanism, comprising a driving gear-wheel meshing with said driven gear-wheel, and having a concentric slot in which said bar may move, a series of plates carried by said driving gear-wheel and corresponding respectively to the key values of the key mechanism, said plates being non-revoluble as to each other and each plate being adapted to be set in a position in the path of movement of the bar different from that of any other plate, each plate having also a projection always in the path of the return movement of the bar, and means for restoring each plate to its initial position.

86. In a calculating-machine, an indicating mechanism comprising a driven gear-wheel for operating the same, a key mechanism, a bar, and operating mechanism for imparting to the bar a uniform to-and-fro oscillation about an axis, in combination with a setting mechanism comprising a driving gear-wheel meshing with said driven gear-wheel and having a concentric slot in which said bar may move, a series of plates carried by said driving gear-wheel and corresponding respectively to the key values of the key mechanism, said plates being non-revoluble as to each other and each plate being adapted to be set in a position in the path of movement of the bar different from that of any other plate, each plate having also a projection always in the path of the return movement of the bar, and means for restoring each plate to its initial position, and a printing mechanism operated by said operating mechanism and with said setting mechanism.

87. In a calculating-machine, an indicating mechanism, a driven gear-wheel for operating the same, a key mechanism, a bar, and operating devices for imparting to said bar, a uniform to-and-fro oscillation about an axis, in combination with a setting mechanism comprising a driving gear-wheel meshing with said driven gear-wheel and having a concentric slot in which said bar may move, a series of plates carried by said driving gear-wheel and corresponding respectively to the key values of the key mechanism, said plates being non-revoluble as to each other and each plate being adapted to be projected into a position in the path of movement of the bar different from that of any other plate, a latching means for the series of plates for retaining a projected plate in the path of the bar and released upon the return movement of the operating devices and a spring for restoring each plate to its initial position.

88. In a calculating-machine, an indicating mechanism, a driven gear-wheel, for operating the same, a key mechanism, a bar, and operating devices for imparting to said bar a uniform to-and-fro oscillation about an axis, in combination with a setting mechanism comprising a driving gear-wheel meshing with said driven gear-wheel and having a concentric slot in which said bar may move, a series of plates carried by said driving gear-wheel and corresponding respectively to the key values of the key mechanism, said plates being non-revoluble as to each other, and each plate being adapted to be projected into a position in the path of movement of the bar different from that of any other plate, latching means for the series of plates for retaining a projected plate in the path of the bar, said means being arranged to be released upon the return movement of the operating devices and a spring for restoring each plate to its initial position and a printing mechanism operated by said operating mechanism.

89. In a calculating-machine, an indicating mechanism, a key mechanism, and an operating mechanism having a uniform to-and-fro movement, in combination with a setting mechanism for determining movements of the indicating mechanism corresponding to the operation of the key mechanism, and movable by the operating mechanism in one direction to actuate the indicating mechanism and in the other direction to restore the same to initial position, retaining means for retaining the setting mechanism in operative position and normally released by the return movement of the operating mechanism, means for rendering the operating mechanism inoperative to release the retaining means, whereby the same amount may be repeatedly added on the indicating mechanism by repeated operations of the operating mechanism, a printing mechanism operated by said operating mechanism and with said setting mechanism, and means for disconnecting the indicating mechanism from the setting mechanism so that the printing mechanism alone will be actuated thereby.

90. In a calculating-machine, an indicating mechanism, a driven gear-wheel for operating the same, a clutch for operating the driven gear-wheel, a key mechanism, and an operating mechanism having a uniform to-and-fro movement, in combination with a setting mechanism for determining the movements of the driven gear-wheel corresponding to the operation of the key mechanism and comprising a driving gear-wheel meshing with said driven gear-wheel, said setting mechanism being movable in one direction to actuate the indicating mechanism and in the other direction to return the same to initial position, retaining means for retaining the setting mechanisms in operative position and normally released by the return movement of the operating mechanism, and means for rendering the operating mechanism inoperative to release the retaining means, whereby the same amount may be repeatedly added on the indicating mechanism by repeated operations of the operating mechanism.

91. In a calculating-machine, an indicating mechanism, a driven gear-wheel for operating the same, a clutch device for operating the driven gear-wheel, a key mechanism, and an operating mechanism having a uniform to-and-fro movement, in combination with a setting mechanism for determining the movements of the driven gear-wheel corresponding to the operations of the key mechanism, and comprising a driving gear-wheel meshing with said driven gear-wheel, said setting mechanism being movable in one direction to actuate the indicating mechanism and in the other direction to return the same to initial position, retaining means for retaining the setting mechanism in operative position, said means being normally released by the return movement of the operating mechanism, means for rendering the operating mechanism inoperative to release the retaining means, whereby the same amount may be repeatedly added on the indicating mechanism by repeated operations of the operating mechanism, a printing mechanism operated by said operating mechanism, and means for disconnecting said clutch members for disconnecting the indicating mechanism from the setting mechanism.

92. In a calculating-machine, an indicating mechanism, a key mechanism, and an operating mechanism having a uniform to-and-fro movement, in combination with a setting mechanism comprising an oscillatory actuating device for said indicating mechanism, a series of plates carried by said actuating device and non-revoluble as to each other and corresponding respectively to the key values of the key mechanism, each plate being adapted to be projected into a position in the path of the operating mechanism different from that of any other plate, a spring for restoring each plate to its initial position, a latch for retaining any plate in its projected position and released by the operating mechanism upon the return movement thereof, and means for rendering the operating mechanism inoperative in connection with the latch.

93. In a calculating-machine, an indicating mechanism, a key mechanism, and an operating mechanism having a uniform to-and-fro movement, in combination with a setting mechanism comprising an oscillatory actuating device for said indicating mechanism, a series of plates carried by said actuating device and non-revoluble as to each other, and corresponding respectively to the key values of the key mechanism, each plate being adapted to be projected into a position in the path of the operating mechanism different from that of any other plate, a spring for restoring each plate to its initial position, and a printing mechanism operated by said operating mechanism.

94. In a calculating-machine, an indicating mechanism, a key mechanism, and an operating mechanism having a uniform to-and-fro movement, in combination with a setting mechanism comprising an oscillatory actuating device for said indicating mechanism, a series of plates carried by said actuating device and non-revoluble as to each other and corresponding respectively to the key values of the key mechanism, each plate being adapted to be projected into a position in the path of the operating mechanism different from that of any other plate, a spring for restoring each plate to its initial position, a latch for retaining any plate in its projecting position, said latch being normally adapted to be released by the operating mechanism upon the return movement thereof, means for rendering the operating mechanism inoperative in connection with the latch, a printing mechanism actuated by said operating mechanism, and means for disconnecting the indicating mechanism from the setting mechanism.

95. In a printing mechanism, a series of type-carriers, a series of movable platens, one for each type-carrier, a common mechanism for positively pressing the series of platens against the type-carriers, and selective means for preventing the operation of any desired number of said platens by said common mechanism.

96. In a printing mechanism, a series of type-carriers, a series of movable platens, one for each type-carrier, a common positive pressure mechanism movable toward and from the series of platens to operate the same to cause an impression, and a series of movable blocks, one for each platen, adapted to be interposed between the pressure mechanism and the platens.

97. In a printing mechanism, a series of type-carriers, a series of movable platens, one for each type-carrier, pressure mechanism movable toward and from the series of platens, a series of independent movable blocks, one for each platen, adapted to be selectively interposed between the pressure mechanism and the platens, and a series of overlapping lugs connected with said blocks whereby automatically to interpose an operated block and the blocks corresponding to type-carriers of lower denominations than that of the highest operated block.

98. In a printing mechanism, a series of type-carriers, a series of movable platens, one for each type-carrier, pressure mechanism movable toward and from the series of platens, a series of independent movable blocks, one for each platen, adapted to be selectively interposed between the pressure mechanism and the platens, operating devices for said blocks comprising a series of parallel operating-bars, and a series of overlapping lugs upon said operating-bars, whereby automatically to interpose between the pressure mechanism and the series of platens the blocks corresponding to the type-carriers of lower denominations than that of the highest operated block.

99. In a printing mechanism, a series of type-carriers, setting mechanism for said type-carriers, pressure mechanism having a movement insufficient to press against the type-carriers, movable mechanism between the pressure mechanism and each type-carrier, and means controlled by the setting mechanism for operating said movable mechanism.

100. In a printing mechanism, a series of type-carriers, set in their normal position with the zero-type at the printing-line, setting mechanism for said type-carriers, a series of movable platens, one for each type-carrier, a single pressure mechanism movable toward and from the series of platens, a series of movable blocks, one for each platen, and connections with the setting mechanism for selectively interposing the blocks between the pressure mechanism and the platens.

101. In a printing mechanism, a series of type-carriers, set in their normal positions with the zero-type at the printing-line, setting mechanism for said type-carriers, a series of movable platens, one for each type-carrier, a single pressure mechanism for operating the series of platens to produce the printing impression, a series of independent movable blocks, one for each platen, connections with the setting mechanism for selectively interposing the blocks between the pressure mechanism and the platens, and means for operating the blocks relating to lower denominations upon movement of any block of higher denomination.

102. In a printing mechanism, a series of type-carriers, set in their normal positions with the zero-type at the printing-line, setting mechanism for said type-carriers, a series of movable platens, one for each type-carrier, a single pressure mechanism for operating the series of platens to produce the printing impression, a series of independent movable blocks one for each platen connections with the setting mechanism for selectively interposing the blocks between the pressure mechanism and the platens, operating devices for said blocks comprising a series of parallel operating-bars, and a series of overlapping lugs upon said operating-bars, whereby automatically to interpose between the pressure mechanism and the series of platens the blocks corresponding to the type-carriers of lower denominations than that of the highest operated block.

103. In a printing-machine, a series of type-carriers, a series of movable platens, one for each type-carrier, a pressure-bar movable toward and from the series of platens for operating the same, a series of setting mechanisms, one for each type-carrier, a series of movable blocks, one for each platen, adapted to be interposed between the pressure-bar and the platens, an operating-bar for each block, lever mechanism operated upon each movement of a setting mechanism to interpose its block as aforesaid, and an operating mechanism for actuating said setting mechanism and said pressure-bar.

104. In a printing-machine, a series of type-carriers, a series of movable platens, one for each type-carrier, a pressure-bar, movable toward and from the series of platens, for operating the same, a series of setting mechanisms, one for each type-carrier, a series of movable blocks, one for each platen, adapted to be interposed between the pressure-bar and the platens, an operating-bar for each block, lever mechanism operated upon each movement of a setting mechanism to interpose its block as aforesaid, means for operating the blocks relating to lower denominations upon movement of any block of higher denomination, and an operating mechanism for actuating said setting mechanism and said pressure-bar.

105. In a printing-machine, a series of type-carriers, a series of movable platens, one for each type-carrier, a pressure-bar movable toward and from the series of platens, for operating the same, a series of setting mechanisms, one for each type-carrier, a series of movable blocks, one for each platen, adapted to be interposed between the pressure-bar and the platens, an operating-bar for each block, lever mechanism operated upon each movement of a setting mechanism to interpose its block as aforesaid, a series of overlapping lugs connected with said blocks whereby automatically to interpose an operated block and the blocks corresponding to type-carriers of lower denominations than that of the highest operated kind, and an operating mechanism for actuating said setting mechanism and said pressure-bar.

106. In a printing-machine, a series of type-carriers, a series of movable platens, one for each type-carrier, a pressure-bar movable toward and from the series of platens for operating the same, a series of setting mechanisms, one for each type-carrier, a series of movable blocks, one for each platen, adapted to be interposed between the pressure-bar and the platens, an operating-bar for each block, lever mechanism operated upon each movement of a setting mechanism to interpose its block as aforesaid, and comprising a series of parallel operating-bars, and a series of overlapping lugs upon said operating-bars, whereby automatically to interpose between the pressure-bar and the series of platens the blocks corresponding to the type-carriers of lower denominations than that of the highest operated block, and an operating mechanism for actuating said setting mechanism and said pressure-bar.

107. In a printing-machine, a series of toothed, oscillatory type-carriers, a series of movable platens, one for each type-carrier, a pressure-bar movable toward and from the series of platens for operating the same, a series of setting mechanisms, each comprising an oscillatory gear-wheel, a shaft and pinions thereon meshing with the gear-wheel and its corresponding type-carrier, one for each type-carrier, a series of movable blocks, one for each platen, adapted to be interposed between the pressure-bar and the platens, an operating-bar for each block, lever mechanism operated upon each movement of a setting mechanism to interpose its block as aforesaid, and an operating mechanism for actuating said setting mechanism and said pressure-bar.

108. In a printing-machine, a series of toothed oscillatory type-carriers, a series of movable platens, one for each type-carrier, a pressure-bar movable toward and from the series of platens for operating the same, a series of setting mechanisms, each comprising an oscillatory gear-wheel, a shaft and pinions thereon meshing with the gear-wheel and with its corresponding type-carrier, one for each type-carrier, a series of movable blocks, one for each platen, adapted to be interposed between the pressure-bar and the platens, an operating-bar for each block, lever mechanism operated upon each movement of a setting mechanism to interpose its block as aforesaid, means for operating the blocks relating to lower denominations upon movement of any block of higher denomination, and an operating mechanism for actuating said setting mechanism and said pressure-bar.

109. In a printing-machine, a series of toothed, oscillatory type-carriers, a series of movable platens, one for each type-carrier, a pressure-bar movable toward and from the series of platens for operating the same, a series of setting mechanisms, each comprising an oscillatory gear-wheel, a shaft and pinions thereon meshing with the gear-wheel and with its corresponding type-carrier, one for each type-carrier, a series of movable blocks, one for each platen, adapted to be interposed between the pressure-bar and the platens, an operating-bar for each block, lever mechanism operated upon each movement of a setting mechanism to interpose its block as aforesaid, a series of overlapping lugs connected with said blocks whereby automatically to interpose an operated block and the blocks corresponding to type-carriers of lower denominations than that of the highest operated block, and an operating mechanism for actuating said setting mechanism and said pressure-bar.

110. In a printing-machine, a series of toothed, oscillatory type-carriers, a series of movable platens, one for each type-carrier, a pressure-bar movable toward and from the series of platens for operating the same, a series of setting mechanisms, each comprising an oscillatory gear-wheel, a shaft and pinions thereon meshing with the gear-wheel and with its corresponding type-carrier, one for each type-carrier, a series of movable blocks, one for each platen, adapted to be interposed between the pressure-bar and the platens, an operating-bar for each block, lever mechanism operated upon each movement of a setting mechanism to interpose its block as aforesaid, and comprising a series of parallel operating-bars and a series of overlapping lugs upon said operating-bars, whereby automatically to interpose between the pressure-bar and the series of platens the blocks corresponding to the type-carriers of lower denominations than that of the highest operated block, and an operating mechanism for actuating said setting mechanism and said pressure-bar.

111. In a printing-machine, a series of type-carriers, a series of movable platens, one for each type-carrier, a pressure-bar movable toward and from the series of platens for operating the same, a series of setting mechanisms, one for each type-carrier, and each comprising an oscillatory member having a peripheral lug thereon, a series of movable blocks, one for each platen, adapted to be interposed between the pressure-bar and the platens, a lever for each setting mechanism operated by said lug upon each movement of its setting mechanism to interpose its block as aforesaid, and an operating mechanism for actuating said setting mechanism and said pressure-bar.

112. In a printing-machine, a series of type-carriers, a series of movable platens, one for each type-carrier, a pressure-bar movable toward and from the series of platens, for operating the same, a series of setting mechanisms, one for each type-carrier and each comprising an oscillatory member having a peripheral lug thereon, a series of movable blocks, one for each platen, adapted to be interposed between the pressure-bar and the platens, a lever for each setting mechanism operated by said lug upon each movement of its setting mechanism to interpose its block as aforesaid, means for operating the blocks relating to lower denominations upon movement of any block of higher denomination, and an operating mechanism for actuating said setting mechanism and said pressure-bar.

113. In a printing-machine, a series of type-carriers, a series of movable platens, one for each type-carrier, a pressure-bar movable toward and from the series of platens for operating the same, a series of setting mechanisms, one for each type-carrier and each comprising an oscillatory member having a peripheral lug thereon, a series of movable blocks, one for each platen, adapted to be interposed between the pressure-bar and the platens, a lever for each setting mechanism operated by said lug upon each movement of its setting mechanism to interpose its block as aforesaid, a series of overlapping lugs connected with said blocks whereby automatically to interpose an operated block and the blocks corresponding to type-carriers of lower denominations than that of the highest operated block, and an operating mechanism for actuating said setting mechanism and said pressure-bar.

114. In a printing-machine, a series of toothed oscillatory type-carriers, a series of movable platens, one for each type-carrier, a pressure-bar movable toward and from the series of platens for operating the same, a series of setting mechanisms, one for each type-carrier, and each comprising an oscillatory wheel having a peripheral lug thereon, a shaft, and pinions thereon meshing with the gear-wheel and its corresponding type-carrier, a series of movable blocks one for each platen, adapted to be interposed between the pressure-bar and the platens, a lever for each setting mechanism operated by said lug upon each movement of its setting mechanism to interpose its block as aforesaid, means for operating the blocks relating to lower denominations upon movement of any block of higher denomination, and an operating mechanism for actuating said setting mechanism and said pressure-bar.

115. In a printing-machine, a series of toothed, oscillatory type-carriers, a series of movable platens, one for each type-carrier, a pressure-bar movable toward and from the series of platens for operating the same, a series of setting mechanisms, one for each type-carrier, and each comprising an oscillatory wheel having a peripheral lug thereon, a shaft, and pinions thereon meshing with the gear-wheel and its corresponding type-carrier, a series of movable blocks, one for each platen, adapted to be interposed between the pressure-bar and the platens, a lever for each setting mechanism operated by said lug upon each movement of its setting mechanism to interpose its block as aforesaid, a series of overlapping lugs connected with said blocks, whereby automatically to interpose an operated block and the blocks corresponding to type-carriers of lower denominations than that of the highest operated block, and an operating mechanism for actuating said setting mechanism and said pressure-bar.

116. In a printing-machine, a series of toothed, oscillatory type-carriers, a series of movable platens, one for each type-carrier, a pressure-bar movable toward and from the series of platens for operating the same, a series of setting mechanisms, one for each type-carrier, and each comprising an oscillatory wheel having a peripheral lug thereon, a shaft, and pinions thereon meshing with the gear-wheel and its corresponding type-carrier, a series of movable blocks, one for each platen, adapted to be interposed between the pressure-bar and the platens, a lever for each setting mechanism operated by said lug upon each movement of its setting mechanism to interpose its block as aforesaid, and comprising a series of parallel operating-bars, and a series of overlapping lugs upon said operating-bars, whereby automatically to interpose between the pressure-bar and the series of platens the blocks corresponding to the type-carriers of lower denominations than that of the highest operated block, and an operating mechanism for actuating said setting mechanism and said pressure-bar.

117. The combination of a series of type-carriers, a striker for producing the printing impression, a movable operating device, a movable part adapted to be driven thereby, a pin carried by said movable part and adapted to be moved into a socket in said operating device, stationary means for moving said pin into its socket when the parts are at rest, means for retaining the pin in said socket and devices connected with said movable part for operating said striker.

118. The combination of a series of type-carriers, a striker for producing the printing impression, a movable operating device, a movable part adapted to be driven thereby, a pin carried by said movable part and adapted to be moved into a socket in said operating device, means for moving said pin into its socket when the parts are at rest, means for retaining the pin in said socket, paper-feeding mechanism, and devices connected with said movable part for operating said striker, and said paper-feeding mechanism.

119. The combination of a series of type-carriers, a striker for producing the printing impression, an operating-shaft, a sleeve on said shaft, a pin carried by the sleeve and adapted to be moved into a socket on the shaft for connecting the sleeve and shaft, a spring tending to move the pin out of the socket, means for retaining the pin in a connecting position, a device for moving the pin into the socket when the parts are at rest and devices connected with the sleeve for operating the striker.

120. The combination of a series of type-carriers, a striker for producing the printing impression, an operating-shaft, a sleeve on said shaft, a pin carried by the sleeve and adapted to be moved into a socket on the shaft for connecting the sleeve and shaft, a spring tending to move the pin out of the socket, means for retaining the pin in a connecting position, a device for moving the pin into the socket when the parts are at rest, paper-feeding mechanism, and devices connected with the sleeve for operating the striker, and said paper-feeding mechanism.

121. The combination of a series of type-carriers, a striker for producing the printing impression, an operating-shaft, a pin carried by the sleeve and adapted to be moved into a socket on the shaft for connecting the sleeve and the shaft, a spring tending to move the pin out of the socket, a stationary curved surface for retaining the pin in a connecting position, a cam device for pressing the pin into the socket when the parts are at rest, and connections between the sleeve and the striker for operating the latter.

122. The combination of a series of type-carriers, a striker for producing the printing impression, an operating-shaft, a sleeve on the shaft, a pin carried by the sleeve and adapted to be moved into a socket on the shaft for connecting the sleeve and the shaft, a spring tending to move the pin out of the socket, a cam device for pressing the pin into the socket when the parts are at rest, paper-feeding mechanism, and connections between the sleeve and both the striker and the paper-feeding mechanism for actuating the same.

123. The combination of a series of type-carriers, a striker for producing the printing impression, a movable operating device, a movable part adapted to be driven thereby, a pin carried by said movable part and adapted to be moved into a socket in said operating device, means for moving said pin into its socket when the parts are at rest, means for retaining the pin in said socket, paper-feeding mechanism, feeding devices for an inking-ribbon, and devices connected with said movable part for operating said striker, said paper-feeding mechanism and said ribbon-feeding mechanism.

124. The combination of a series of type-carriers, a striker for producing the printing impression, an operating-shaft, a sleeve on said shaft, a pin carried by the sleeve and adapted to be moved into a socket on the shaft for connecting the sleeve and shaft, a spring tending to move the pin out of the socket, means for retaining the pin in a connecting position, a device for moving the pin into the socket when the parts are at rest, paper-feeding mechanism, feeding devices for an inking-ribbon, and devices connected with the sleeve for operating the striker, said paper-feeding mechanism and said ribbon-feeding mechanism.

125. The combination of a series of type-carriers, a striker for producing the printing impression, an operating-shaft, a sleeve on the shaft, a pin carried by the sleeve and adapted to be moved into a socket on the shaft for connecting the sleeve and the shaft, a spring tending to move the pin out of the socket, a stationary curved surface for retaining the pin in a connecting position, a stationary cam device for pressing the pin into the socket when the parts are at rest, paper-feeding mechanism, feeding devices for an inking-ribbon, and connections between the sleeve and the striker, the paper-feeding mechanism and the ribbon-feeding mechanism for operating the last three devices from said sleeve.

126. In a printing mechanism, the combination of a series of type-carriers each having a series of notches corresponding to the type positions, a locking-bar for the series of type-carriers adapted to enter said notches, an inking-ribbon-feeding mechanism, an operating mechanism for operating said locking-bar, and connections with said operating mechanism for operating said ribbon-feeding mechanism.

127. In a calculating-machine, an indicating mechanism, a key mechanism and an operating mechanism having a uniform to-and-fro movement in combination with a setting mechanism comprising an actuating device, a series of plates movable into the path of the actuating device, latches for holding said plates in their operative positions, means for tripping said latches upon each operation of the machine, and devices for rendering said tripping means inoperative in connection with the latches.

128. In a printing mechanism, a series of type-carriers, a series of movable platens one for each type-carrier, a pressure device for positively actuating said platens, movable devices arranged to be interposed between the pressure device and the respective platens and means for connecting said movable devices so that when one of the same is operated all the companion devices to one side of the same are correspondingly operated.

129. In a calculating machine, an indicating mechanism, a key mechanism, and an operating mechanism having a to-and-fro movement in combination with a setting mechanism comprising a series of plates arranged to be moved independently by the key mechanism and all together by the operating mechanism and means connecting the indicating mechanism to the setting mechanism.

130. In a calculating-machine, an endless guideway, a series of movable tally-pieces in said guideway and forming a column arranged to indicate an amount by diminution of the column, an accumulating column of tally-pieces and a transfer-lever having a regular working fulcrum and a transferring-fulcrum; the latter being so arranged as to be rendered operative by the tally-pieces in the accumulating column.

131. In a calculating-machine, an endless guideway, a series of tally-pieces movable in said guideway and comprising a column of said tally-pieces operated to indicate an amount by movement of the column in combination with a pocket-wheel for moving said column, an operating mechanism, and a clutch between said operating mechanism and said pocket-wheel.

132. In a calculating-machine, an endless guideway, a series of tally-pieces movable in said guideway and comprising a column of said tally-pieces operated to indicate an amount by movement of the column, in combination with a rotary device for moving said column, an operating mechanism and a clutch between the rotary device and operating mechanism.

133. In a calculating-machine, an endless guideway, a series of tally-pieces movable in said guideway and comprising a column operated to indicate an amount by diminution of the column, a rotary device for moving said column, and setting devices for controlling the movements of the rotary device.

134. In a calculating-machine, a series of indicating-columns of movable tally-pieces operated to indicate an amount by diminutions of the columns, setting mechanisms for determining the diminutions of said columns, means coöperating with said setting mechanisms for producing the diminutions as per the values of said setting mechanisms, and carrying mechanisms for producing a diminution of a column of a higher denomination when the preceding column of lower denomination has reached or exceeded its maximum registering capacity.

135. In a calculating-machine, the combination with a guideway, of a series of tally-pieces forming a column therein and means for moving the entire column predetermined graduated distances at single operations to bring the uppermost tally-piece into proper indicating position.

136. In a calculating-machine, an endless guideway, a series of tally-pieces movable in said guideway and comprising a column the upper tally-piece of which indicates the amount, a stationary scale-plate in proximity to the column, and means for moving the column from below by predetermined graduated distances at single operations to bring its uppermost tally-piece into different indicating positions.

137. In a calculating-machine, the combination with an indicating mechanism comprising a series of movable tally-pieces, of a printing mechanism, a common operating means for said indicating and printing mechanisms, and means for so adjusting the parts that the printer will be operated by the common operating means without operating the indicating mechanism.

138. In a calculating-machine, an indicating mechanism, an operating mechanism having a uniform to-and-fro movement in combination with a series of setting elements differentially spaced with reference to said operating mechanism and arranged to be projected into the path of the operating mechanism and subsequently carried thereby through a portion of its aforesaid uniform movement, means connecting said indicating mechanism and said elements, latches for holding said elements in their set positions, means for tripping said latches upon each operation of the machine and devices for rendering said tripping means inoperative in connection with the latches.

139. In a calculating-machine, an operating mechanism, a series of elements arranged to be moved into different positions in the path of said operating mechanism so as to be operated thereby through different degrees, an indicating-column of tally-pieces, devices for moving the column and means operated by said elements for actuating said moving devices.

140. In a calculating-machine, an indicating mechanism, an operating mechanism having a uniform to-and-fro movement, in combination with a setting mechanism comprising a series of plates arranged to be projected into different positions in the path of the operating mechanism, a common means connected to all of the plates so as to be operated upon the movement of any one of the same and devices connecting said common means to the indicating mechanism.

141. In a calculating-machine, an indicating mechanism, an operating mechanism having a uniform to-and-fro movement in combination with a setting mechanism comprising a series of elements arranged to be projected into the path of the operating mechanism to receive different movements therefrom, and means intermediate said elements and the indicating mechanism whereby the movements of the former are transmitted to the latter.

142. In a calculating-machine, an indicating mechanism, an operating mechanism having a uniform to-and-fro movement in combination with a setting mechanism comprising a series of elements arranged to be set by the keys so that each will be engaged by the operating mechanism sooner or later and thus moved different distances and intermediate devices connecting said elements and the indicating mechanism.

143. In a calculating-machine, an endless guideway, a series of tally-pieces movable in said guideway, means for separating in said series a movable indicating-column of tally-pieces adapted to indicate an amount, and an accumulating column composed of tally-pieces complementary in number to the number of tally-pieces in the indicating-column, means for operating the columns and means operated at will for conveying a number of tally-pieces from the accumulating column to the indicating for causing the latter to indicate zero.

144. In a calculating-machine, a column of movable tally-pieces arranged to be moved as a whole to bring the uppermost tally-piece into the proper indicating position, in combination with a setting mechanism representing different unit values and an operating mechanism for moving the column of tally-pieces correspondingly to the different key values of the setting mechanism.

145. In a calculating-machine, a column of movable tally-pieces arranged to be moved as a whole to bring the uppermost tally-piece into the proper indicating position, a setting mechanism, means for moving the column according to the setting mechanism, and devices for restoring the column to its maximum height by conveying tally-pieces thereto whenever the maximum registering capacity of the column has been reached or exceeded.

146. In a calculating-machine, columns of movable tally-pieces, each arranged to be moved as a whole to bring the uppermost tally-piece into the proper indicating position, and carrying mechanism for moving a column a distance equal to one tally-piece whenever the maximum registering capacity in the next lower column has been reached or exceeded.

147. The combination with a series of type-carriers, a platen, an operating device, a movable part adapted to be driven thereby, a pin carried by said movable part and adapted to be moved into engagement with said operating device when the parts are in normal position, means for moving said pin into such engagement, devices for retaining the pin in such engagement after it has moved from normal position, and means connecting the movable part to the platen.

148. In a printing mechanism, a series of type-carriers, a series of independent platens, a common pressure device, and movable devices arranged to be interposed between the pressure device and the desired platens.

149. In a printing mechanism, a series of type-carriers, a series of independent platens, a pressure device and movable devices arranged to be interposed between the pressure device and the platens and provided with connecting projections whereby when one of said movable devices is actuated all the companion devices to one side of the same are similarly actuated.

150. In a calculating-machine, the combination with an endless guideway, of a series of tally-pieces contained within the same, and means for moving the entire series of tally-pieces differentially, with provisions for indicating the amount of such movement.

WILLIAM H. CLARK.

Witnesses:
W. C. KOHLMETZ,
FRANCES BISSELL.